US012561176B2

(12) United States Patent
Muttikal Thomas et al.

(10) Patent No.: US 12,561,176 B2
(45) Date of Patent: Feb. 24, 2026

(54) PROACTIVE ADJUSTMENT OF RESOURCE ALLOCATION TO INFORMATION TECHNOLOGY ASSETS BASED ON PREDICTED RESOURCE UTILIZATION

(71) Applicant: Dell Products L.P., Round Rock, TX (US)

(72) Inventors: Naveen Silvester Muttikal Thomas, Bangalore (IN); Gabrielle Kali Sweda, Berkley, MI (US); Naga Maneesh Kolisetti, Guntur (IN)

(73) Assignee: Dell Products L.P., Round Rock, TX (US)

( * ) Notice: Subject to any disclaimer, the term of this patent is extended or adjusted under 35 U.S.C. 154(b) by 459 days.

(21) Appl. No.: 18/131,726

(22) Filed: Apr. 6, 2023

(65) Prior Publication Data

US 2024/0338254 A1     Oct. 10, 2024

(51) Int. Cl.
  *G06F 9/50* (2006.01)
  *G06F 9/455* (2018.01)

(52) U.S. Cl.
  CPC .......... *G06F 9/505* (2013.01); *G06F 9/45558* (2013.01); *G06F 9/5077* (2013.01); *G06F 2009/4557* (2013.01)

(58) Field of Classification Search
  CPC ................. G06F 9/505; G06F 9/45558; G06F 2009/4557; G06F 9/5077
  USPC .......................................................... 718/1
  See application file for complete search history.

(56) References Cited

U.S. PATENT DOCUMENTS

| | | | | |
|---|---|---|---|---|
| 10,713,097 B2 * | 7/2020 | Asthana | .................. | H04L 67/51 |
| 11,514,317 B2 * | 11/2022 | Lakshmikantha | ....... | G06N 3/08 |
| 2020/0167610 A1 * | 5/2020 | Hong | .................... | G06F 18/217 |
| 2020/0311573 A1 * | 10/2020 | Desai | ...................... | G06N 7/01 |
| 2021/0271507 A1 * | 9/2021 | Matthew | .............. | G06F 9/5077 |
| 2024/0037419 A1 * | 2/2024 | Mukhopadhyay | ..... | G06N 5/022 |

OTHER PUBLICATIONS

Nicholson WB, Matteson DS, Bien J. 2017b. VARX-L: structured regularization for large vector autoregressions with exogenous variables. Int. J. Forecast 33(3):627-51 (Year: 2017).*

(Continued)

*Primary Examiner* — Jacob D Dascomb
(74) *Attorney, Agent, or Firm* — Ryan, Mason & Lewis, LLP

(57) ABSTRACT

An apparatus comprises a processing device configured to obtain monitoring data characterizing resource utilization by information technology (IT) assets having resources assigned from a shared resource pool, to select features for use in modeling predicted resource utilization by the IT assets in future time periods, to generate predictions of resource utilization by the IT assets in each of the future time periods, and to determine whether the predicted resource utilization by a given IT asset exhibits at least a threshold difference from its current resource allocation. The processing device is further configured, response to the determination, to proactively adjust resource allocation to the given IT asset from the shared resource pool for the given future time period based at least in part on the predicted resource utilization, for the given future time period, by other ones of the IT assets having resources assigned from the shared resource pool.

20 Claims, 22 Drawing Sheets

(56)     References Cited

OTHER PUBLICATIONS

VMware, Inc., "VMware vRealize Log Insight," Data Sheet, Item No. 218097, Mar. 2019, 2 pages.

VMware, Inc., "vRealize Operations 8.5 Release Notes," https://docs.vmware.com/en/vRealize-Operations-Manager/8.5/rn/vRealize-Operations-Manager-85.html, Jan. 2023, 11 pages.

VMware, Inc., "VMware vCenter Server," Data Sheet, Item No. 160853, Aug. 2018, 4 pages.

VMware, Inc., "VMware Aria Operations," Data Sheet, Feb. 2023, 2 pages.

VMware, Inc., "VMware VirtualCenter," User's Manual, Version 1.4, Jul. 6, 2006, 508 pages.

VMware, Inc., "vSphere Virtual Machine Administration," Update 3, VMware vSphere 7.0, VMware ESXi 7.0, vCenter Server 7.0, Jul. 4, 2022, 317 pages.

StackStorm, "StackStorm Documentation," https://docs.stackstorm.com/, Accessed Mar. 16, 2023, 3 pages.

Tutorials Point, "Elastic Search," https://www.tutorialspoint.com/elasticsearch/elasticsearch_tutorial.pdf, Jun. 2019, 152 pages.

Zabbix, "Zabbix Manual," https://www.zabbix.com/documentation/current/downloads/Zabbix_Documentation_6.4.en.pdf, Mar. 16, 2023, 1835 pages.

* cited by examiner

100

CLIENT DEVICE 102-1

CLIENT DEVICE 102-2

· · ·

CLIENT DEVICE 102-M

NETWORK 104

INFORMATION TECHNOLOGY (IT) INFRASTRUCTURE 105

IT ASSETS 106

IT ASSET RESOURCE ALLOCATION DATABASE 108

RESOURCE ALLOCATION MANAGEMENT SYSTEM 110

LOGS AND METRIC COLLECTION LOGIC 112

RESOURCE NEED PREDICTION LOGIC 114

RESOURCE POOL MANAGEMENT LOGIC 116

REMEDIATION ACTION CONTROL LOGIC 118

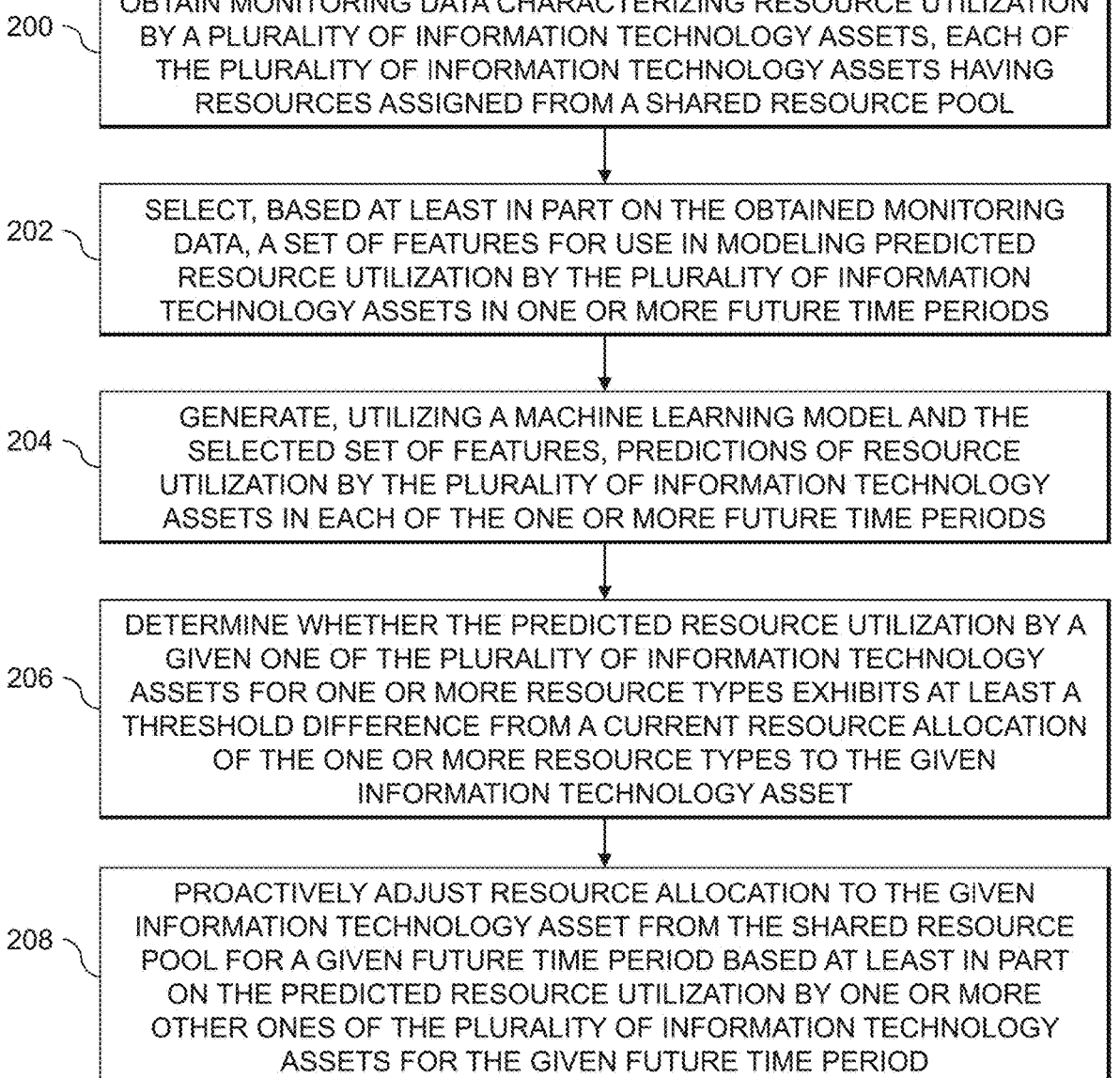

200 — OBTAIN MONITORING DATA CHARACTERIZING RESOURCE UTILIZATION BY A PLURALITY OF INFORMATION TECHNOLOGY ASSETS, EACH OF THE PLURALITY OF INFORMATION TECHNOLOGY ASSETS HAVING RESOURCES ASSIGNED FROM A SHARED RESOURCE POOL

202 — SELECT, BASED AT LEAST IN PART ON THE OBTAINED MONITORING DATA, A SET OF FEATURES FOR USE IN MODELING PREDICTED RESOURCE UTILIZATION BY THE PLURALITY OF INFORMATION TECHNOLOGY ASSETS IN ONE OR MORE FUTURE TIME PERIODS

204 — GENERATE, UTILIZING A MACHINE LEARNING MODEL AND THE SELECTED SET OF FEATURES, PREDICTIONS OF RESOURCE UTILIZATION BY THE PLURALITY OF INFORMATION TECHNOLOGY ASSETS IN EACH OF THE ONE OR MORE FUTURE TIME PERIODS

206 — DETERMINE WHETHER THE PREDICTED RESOURCE UTILIZATION BY A GIVEN ONE OF THE PLURALITY OF INFORMATION TECHNOLOGY ASSETS FOR ONE OR MORE RESOURCE TYPES EXHIBITS AT LEAST A THRESHOLD DIFFERENCE FROM A CURRENT RESOURCE ALLOCATION OF THE ONE OR MORE RESOURCE TYPES TO THE GIVEN INFORMATION TECHNOLOGY ASSET

208 — PROACTIVELY ADJUST RESOURCE ALLOCATION TO THE GIVEN INFORMATION TECHNOLOGY ASSET FROM THE SHARED RESOURCE POOL FOR A GIVEN FUTURE TIME PERIOD BASED AT LEAST IN PART ON THE PREDICTED RESOURCE UTILIZATION BY ONE OR MORE OTHER ONES OF THE PLURALITY OF INFORMATION TECHNOLOGY ASSETS FOR THE GIVEN FUTURE TIME PERIOD

| T-SHIRT SIZE | CPU | RAM (GB) | BASE DISK (GB) | MAX DISK ($5/GB) |
|---|---|---|---|---|
| XL | 32 | 128 | 100 | 2500GB |
| L | 16 | 64 | 100 | 1500GB |
| M | 8 | 32 | 100 | 800GB |
| S | 4 | 16 | 100 | 750GB |
| XS | 2 | 8 | 100 | 200GB |

350

2 CPU
8GB RAM
*100GB DISK
$375

Max Disk
200gb x $5/gb

4 CPU
16GB RAM
*100GB DISK
$750

Max Disk
750gb x $5/gb

8 CPU
32GB RAM
*100GB DISK
$1350

Max Disk
800gb x $5/gb

16 CPU
64GB RAM
*100GB DISK
$6000

Max Disk
1500gb x $5/gb

32 CPU
128GB RAM
*100GB DISK
$12000

Max Disk
2500gb x $5/gb

Figure 8:
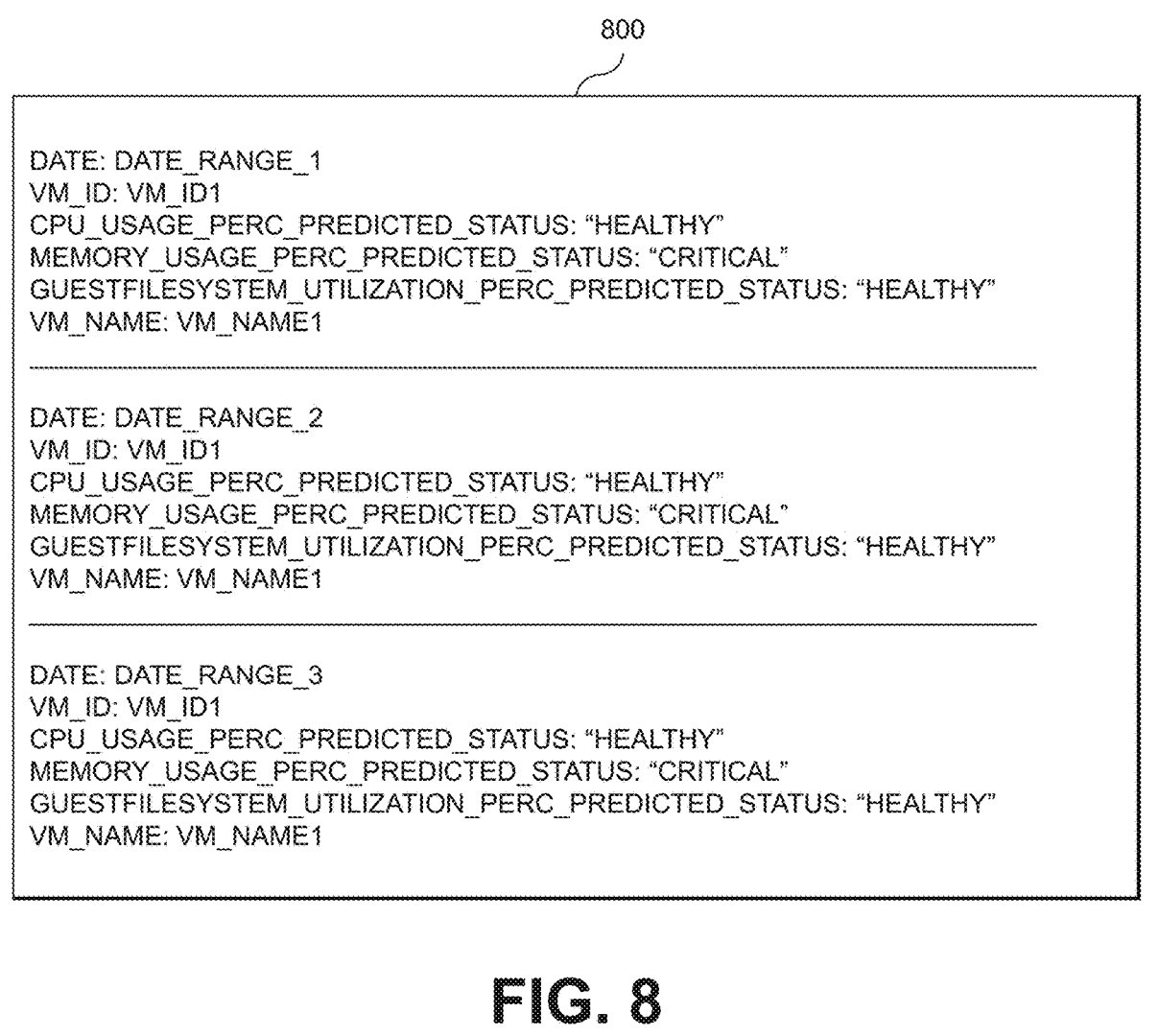

800

DATE: DATE_RANGE_1
VM_ID: VM_ID1
CPU_USAGE_PERC_PREDICTED_STATUS: "HEALTHY"
MEMORY_USAGE_PERC_PREDICTED_STATUS: "CRITICAL"
GUESTFILESYSTEM_UTILIZATION_PERC_PREDICTED_STATUS: "HEALTHY"
VM_NAME: VM_NAME1

DATE: DATE_RANGE_2
VM_ID: VM_ID1
CPU_USAGE_PERC_PREDICTED_STATUS: "HEALTHY"
MEMORY_USAGE_PERC_PREDICTED_STATUS: "CRITICAL"
GUESTFILESYSTEM_UTILIZATION_PERC_PREDICTED_STATUS: "HEALTHY"
VM_NAME: VM_NAME1

DATE: DATE_RANGE_3
VM_ID: VM_ID1
CPU_USAGE_PERC_PREDICTED_STATUS: "HEALTHY"
MEMORY_USAGE_PERC_PREDICTED_STATUS: "CRITICAL"
GUESTFILESYSTEM_UTILIZATION_PERC_PREDICTED_STATUS: "HEALTHY"
VM_NAME: VM_NAME1

| | DATE RANGE | VM ID | PREDICTED CPU USAGE (%) - STATUS | PREDICTED MEMORY USAGE (%) - STATUS | PREDICTED GUEST FILESYSTEM UTILIZATION (%) - STATUS | VM NAME |
|---|---|---|---|---|---|---|
| 1 | RANGE_1 | VM_ID1 | HEALTHY | CRITICAL | HEALTHY | VM_NAME1 |
| 2 | RANGE_2 | VM_ID1 | HEALTHY | CRITICAL | HEALTHY | VM_NAME1 |
| 3 | RANGE_3 | VM_ID1 | HEALTHY | CRITICAL | HEALTHY | VM_NAME1 |
| 4 | RANGE_4 | VM_ID1 | HEALTHY | CRITICAL | HEALTHY | VM_NAME1 |
| 5 | RANGE_5 | VM_ID1 | HEALTHY | CRITICAL | HEALTHY | VM_NAME1 |
| 6 | RANGE_6 | VM_ID1 | HEALTHY | CRITICAL | HEALTHY | VM_NAME1 |
| 7 | RANGE_7 | VM_ID1 | HEALTHY | CRITICAL | HEALTHY | VM_NAME1 |
| 8 | RANGE_8 | VM_ID1 | HEALTHY | CRITICAL | HEALTHY | VM_NAME1 |
| 9 | RANGE_9 | VM_ID1 | HEALTHY | CRITICAL | HEALTHY | VM_NAME1 |
| 10 | RANGE_10 | VM_ID1 | HEALTHY | CRITICAL | HEALTHY | VM_NAME1 |
| 11 | RANGE_11 | VM_ID1 | HEALTHY | CRITICAL | HEALTHY | VM_NAME1 |
| 12 | RANGE_12 | VM_ID1 | HEALTHY | CRITICAL | HEALTHY | VM_NAME1 |

| CPU USAGE (%) - STATUS | | | | |
|---|---|---|---|---|
| | | PREDICTED | | |
| | | HEALTHY | MODERATE CRITICAL | CRITICAL |
| ACTUAL | HEALTHY | 1836092 | 13062 | 3988 |
| | MODERATE CRITICAL | 38868 | 76251 | 6180 |
| | CRITICAL | 4828 | 9875 | 43314 |

1105

| MEMORY USAGE (%) - STATUS | | | | |
|---|---|---|---|---|
| | | PREDICTED | | |
| | | HEALTHY | MODERATE CRITICAL | CRITICAL |
| ACTUAL | HEALTHY | 373860 | 11680 | 2662 |
| | MODERATE CRITICAL | 10054 | 565823 | 83425 |
| | CRITICAL | 1883 | 9638 | 973433 |

1110

| GUEST FILESYSTEM UTILIZATION (%) - STATUS | | | | |
|---|---|---|---|---|
| | | PREDICTED | | |
| | | HEALTHY | MODERATE CRITICAL | CRITICAL |
| ACTUAL | HEALTHY | 1719728 | 31242 | 7452 |
| | MODERATE CRITICAL | 10390 | 170375 | 42483 |
| | CRITICAL | 112 | 325 | 50351 |

| PERFORMANCE MEASURE | CPU | MEMORY | GUEST FILESYSTEM |
|---|---|---|---|
| ACCURACY | 96% | 94% | 95% |
| PRECISION FOR CRITICAL STATUS | 81% | 92% | 50% |
| RECALL FOR CRITICAL STATUS | 75% | 99% | 99% |
| F1 SCORE | 78% | 95% | 67% |

PROACTIVE ADJUSTMENT OF RESOURCE ALLOCATION TO INFORMATION TECHNOLOGY ASSETS BASED ON PREDICTED RESOURCE UTILIZATION

FIELD

The field relates generally to information processing, and more particularly to management of information processing systems.

BACKGROUND

As the value and use of information continues to increase, individuals and businesses seek additional ways to process and store information. Information handling systems and other types of information processing systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems.

SUMMARY

Illustrative embodiments of the present disclosure provide techniques for proactive adjustment of resource allocation to information technology assets based on predicted resource utilization.

In one embodiment, an apparatus comprises at least one processing device comprising a processor coupled to a memory. The at least one processing device is configured to obtain monitoring data characterizing resource utilization by each of a plurality of information technology assets having resources assigned from a shared resource pool, and to select, based at least in part on the obtained monitoring data, a set of features for use in modeling predicted resource utilization by the plurality of information technology assets in one or more future time periods. The at least one processing device is also configured to generate, utilizing a machine learning model and the selected set of features, predictions of resource utilization by the plurality of information technology assets in each of the one or more future time periods, and to determine whether the predicted resource utilization by a given one of the plurality of information technology assets for one or more resource types exhibits at least a threshold difference from a current resource allocation of the one or more resource types to the given information technology asset. The at least one processing device is further configured, responsive to determining that the predicted resource utilization by the given information technology asset for the one or more resource types exhibits at least the threshold difference from the current resource allocation of the one or more resource types to the given information technology asset, to proactively adjust resource allocation to the given information technology asset from the shared resource pool for a given future time period based at least in part on the predicted resource utilization, for the given future time period, by one or more other ones of the plurality of information technology assets having resources assigned from the shared resource pool.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for proactive adjustment of resource allocation to information technology assets based on predicted resource utilization in an illustrative embodiment.

FIG. 8 shows machine learning model prediction results for an information technology asset in an illustrative embodiment.

FIG. 9 shows a table of machine learning model prediction results for an information technology asset in an illustrative embodiment.

FIG. 11 shows confusion matrix tables summarizing machine learning model predictive performance in an illustrative embodiment.

FIG. 12 shows a table summarizing performance measures for a machine learning model for different resource metrics in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
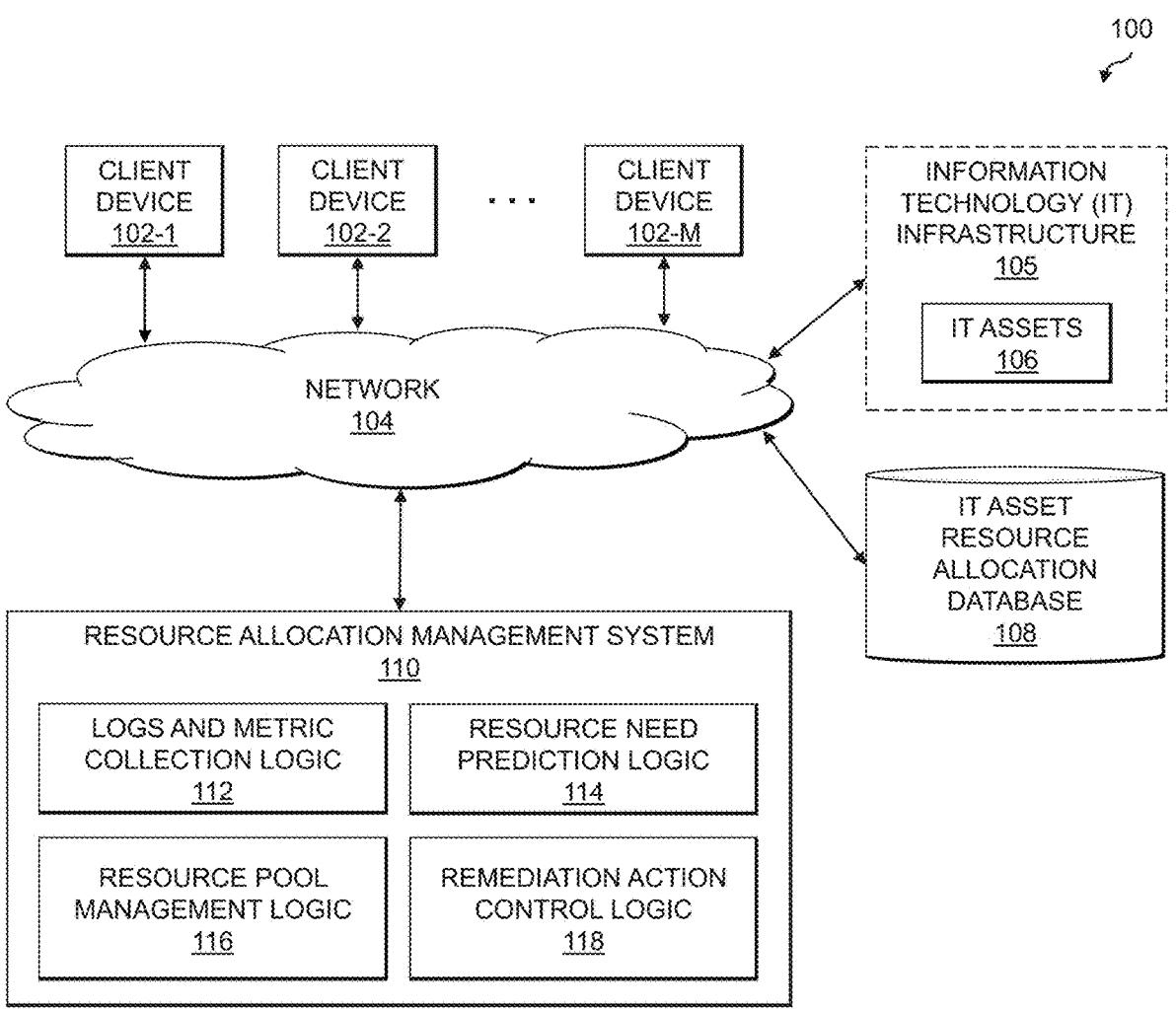
FIG. 1 is a block diagram of an information processing system configured for proactive adjustment of resource allocation to information technology assets based on predicted resource utilization in an illustrative embodiment.

FIG. 1 shows an information processing system 100 configured in accordance with an illustrative embodiment. The information processing system 100 is assumed to be built on at least one processing platform and provides functionality for dynamic and adaptive allocation of resources to information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an IT asset resource allocation database 108, and a resource allocation management system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the resource allocation management system 110 is used for an enterprise system. For example, an enterprise may subscribe to or otherwise utilize the resource allocation management system 110 for managing its assets (e.g., IT assets 106 in the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities). In other embodiments, the resource allocation management system 110 may be operated by an enterprise that is a hardware or software vendor of assets (e.g., IT assets 106 in the IT infrastructure 105, the client devices 102).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The IT asset resource allocation database 108 is configured to store and record various information that is utilized by the resource allocation management system 110 for dynamically adapting the resource allocation for different ones of the IT assets 106. Such information may include, but is not limited to, the current amounts of different resources (e.g., processing, memory, network, storage, etc.) which are allocated for use by different ones of the IT assets 106. In some cases, the IT assets 106 are allocated resources from a shared resource pool (e.g., such as a set of VMs) which run on common hypervisor host device (e.g., a host device running a bare metal hypervisor, such as VMware® ESXi, a cloud computing virtualization platform, etc.). The IT asset resource allocation database 108 may track overall resource allocation and usage on the individual IT asset level, as well as for groups of IT assets which are provisioned resources from a common resource pool. The IT asset resource allocation database 108 may also store logs and metric data associated with resource consumption by different ones of the IT assets 106, which are utilized by the resource allocation management system 110 for predicting resource needs of the IT assets 106 and for selecting remediation actions (e.g., to dynamically adjust resource allocation for the IT assets 106). In some embodiments, one or more of the storage systems utilized to implement the IT asset resource allocation database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the resource allocation management system 110, as well as to support communication between the resource allocation management system 110 and other related systems and devices not explicitly shown.

In some embodiments, the client devices 102 are assumed to be associated with system administrators, IT managers or other authorized personnel responsible for managing the IT assets 106 of the IT infrastructure 105. For example, a given one of the client devices 102 may be operated by a user to access a graphical user interface (GUI) provided by the resource allocation management system 110 to manage one or more of the IT assets 106 of the IT infrastructure 105. The resource allocation management system 110 may be provided as a cloud service that is accessible by the given client device 102 to allow the user thereof to manage one or more of the IT assets 106 of the IT infrastructure 105 (e.g., including for reviewing resource need predictions, suggested remediation actions, remediation actions previously taken, etc. for such IT assets 106). In some embodiments, the IT assets 106 of the IT infrastructure 105 are owned or operated by the same enterprise that operates the resource allocation management system 110 (e.g., where an enterprise such as a business provides support for the assets it operates). In other embodiments, the IT assets 106 of the IT infrastructure 105 may be owned or operated by one or more enterprises different than the enterprise which operates the resource allocation management system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding the IT assets 106 (e.g., logs and metrics data, etc.) which may be used for predicting resource needs of the IT assets 106, and for selecting and applying remediation actions for different ones of the IT assets 106. It should be noted that a "host agent" as this term is generally used herein may comprise an automated entity, such as a software entity running on a processing device. Accordingly, a host agent need not be a human entity.

The resource allocation management system 110 in the FIG. 1 embodiment is assumed to be implemented using at least one processing device. Each such processing device generally comprises at least one processor and an associated memory, and implements one or more functional modules or logic for controlling certain features of the resource allocation management system 110. In the FIG. 1 embodiment, the resource allocation management system 110 implements logs and metric collection logic 112, resource need prediction logic 114, resource pool management logic 116, and remediation action control logic 118. The logs and metric collection logic 112 is configured to obtain monitoring data characterizing resource utilization by each of a set of the IT assets 106 having resources assigned from a shared resource pool, and to select, based at least in part on the obtained monitoring data, a set of features for use in modeling predicted resource utilization by the set of IT assets 106 in one or more future time periods. The resource need prediction logic 114 is configured to generate, utilizing a machine learning model and the selected set of features, predictions of resource utilization by the set of IT assets 106 in each of the one or more future time periods, and to determine whether the predicted resource utilization by a given one of the IT assets for one or more resource types exhibits at least a threshold difference from a current resource allocation of the one or more resource types to the given IT asset. The resource pool management logic 116 and the remediation action control logic 118 are configured, responsive to determining that the predicted resource utilization by the given IT asset for the one or more resource types exhibits at least the threshold difference from the current resource allocation of the one or more resource types to the given IT asset, to proactively adjust resource allocation to the given IT asset from the shared resource pool for the given future time period taking into account the predicted resource utilization, for the given time period, by one or more other ones of the IT assets 106 having resources allocated from the same shared resource pool.

It is to be appreciated that the particular arrangement of the client devices 102, the IT infrastructure 105 and the resource allocation management system 110 illustrated in the FIG. 1 embodiment is presented by way of example only, and alternative arrangements can be used in other embodiments. As discussed above, for example, the resource allocation management system 110 (or portions of components thereof, such as one or more of the logs and metric collection logic 112, the resource need prediction logic 114, the resource pool management logic 116, and the remediation action control logic 118) may in some embodiments be implemented internal to one or more of the client devices 102 and/or the IT infrastructure 105 (e.g., via host agents running on the client devices 102 and/or the IT assets 106 of the IT infrastructure 105).

At least portions of the logs and metric collection logic 112, the resource need prediction logic 114, the resource pool management logic 116, and the remediation action control logic 118 may be implemented at least in part in the form of software that is stored in memory and executed by a processor.

The resource allocation management system 110 and other portions of the information processing system 100, as will be described in further detail below, may be part of cloud infrastructure.

The resource allocation management system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT asset resource allocation database 108 and the resource allocation management system 110 or components thereof (e.g., the logs and metric collection logic 112, the resource need prediction logic 114, the resource pool management logic 116, and the remediation action control logic 118) may be implemented on respective distinct processing platforms, although numerous other arrangements are possible. For example, in some embodiments at least portions of the resource allocation management system 110 and one or more of the client devices 102, the IT infrastructure 105 and/or the IT asset resource allocation database 108 are implemented on the same processing platform. A given client device (e.g., 102-1) can therefore be implemented at least in part within at least one processing platform that implements at least a portion of the resource allocation management system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the IT asset resource allocation database 108 and the resource allocation management system 110, or portions or components thereof, to reside in different data centers. Numerous other distributed implementations are possible. The resource allocation management system 110 can also be implemented in a distributed manner across multiple data centers.

Additional examples of processing platforms utilized to implement the resource allocation management system 110 and other components of the information processing system 100 in illustrative embodiments will be described in more detail below in conjunction with FIGS. 15 and 16.

It is to be appreciated that these and other features of illustrative embodiments are presented by way of example only, and should not be construed as limiting in any way.

It is to be understood that the particular set of elements shown in FIG. 1 for proactive adjustment of resource allocation to IT assets based on predicted resource utilization is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for proactive adjustment of resource allocation to IT assets based on predicted resource utilization will now be described in more detail with reference to the flow diagram of FIG. 2. It is to be understood that this particular process is only an example, and that additional or alternative processes for proactive adjustment of resource allocation to IT assets based on predicted resource utilization may be used in other embodiments.

In this embodiment, the process includes steps 200 through 208. These steps are assumed to be performed by the resource allocation management system 110 utilizing the logs and metric collection logic 112, the resource need prediction logic 114, the resource pool management logic 116, and the remediation action control logic 118. The process begins with step 200, obtaining monitoring data characterizing resource utilization by a plurality of IT assets, each of the plurality of IT assets having resources assigned from a shared resource pool. The plurality of IT assets may comprise a plurality of VMs in a VM cluster, and the shared resource pool may comprise resources of a virtualization infrastructure on which the plurality of VMs of the VM cluster run. The virtualization infrastructure may comprise a single host device running a bare metal hypervisor, a group of two or more host devices running bare metal hypervisors, etc.

In step 202, a set of features is selected for use in modeling predicted resource utilization by the plurality of IT assets in one or more future time periods. Selecting the set of features in step 202 may be based at least in part on at least one of: determining relationships between different ones of a plurality of features based at least in part on performing bivariate or multivariate analysis and plotting a correlation matrix; finding correlated ones of the plurality of features utilizing Pearson coefficient; and checking for multicollinearity of different ones of the plurality of features.

A machine learning model and the selected set of features are utilized in step 204 to generate predictions of resource utilization by the plurality of IT assets in each of the one or more future time periods. The predictions of resource utilization may comprise predictions of central processing unit usage, memory usage, and guest filesystem utilization. A determination is made in step 206 as to whether the predicted resource utilization by a given one of the plurality of IT assets for one or more resource types exhibits at least a threshold difference from a current resource allocation of the one or more resource types to the given IT asset. Responsive to determining that the predicted resource utilization by the given IT asset for the one or more resource types exhibits at least the threshold difference from the current resource allocation of the one or more resource types to the given IT asset, resource allocation to the given IT asset from the shared resource pool is proactively adjusted for the given future time period taking into account the predicted resource utilization, for the given future time period, by one or more other ones of the plurality of IT assets having resources assigned from the shared resource pool in step 208. Step 208 may comprise dynamically scaling resources of at least a given one of the one or more resource types which are allocated to the given IT asset while the given IT asset is operating.

The given IT asset may be associated with a resource allocation template specifying amounts of two or more different resource types allocated from the shared resource pool to the given IT asset. The two or more different resource types may comprise processing resources, memory resources, and storage resources. Proactively adjusting the resource allocation to the given IT asset for the given future time period in step 208 may comprise changing the resource allocation template associated with the given IT asset.

The machine learning model may comprise a vector autoregression (VAR) model. The VAR model may comprise a VAR model for multi-step forecasting with dynamic selection of exogenous variables. The machine learning model may alternatively comprise a deep learning model, such as a long short-term memory (LSTM) machine learning model. The FIG. 2 process may further include adjusting one or more configuration parameters of the machine learning model based at least in part on cross-validation of machine learning prediction performance at the individual IT asset level.

Illustrative embodiments provide technical solutions for software application ecosystems and frameworks. The technical solutions enable a dynamic approach for predicting components (e.g., of VMs or other IT assets of an IT infrastructure) that are predicted to become "out-of-bound" (e.g., enter a sub-optimal state) through automatic discovery and underlying feature analysis with artificial intelligence (AI) or machine learning (ML) algorithms. The technical solutions also enable automated generation or selection of tailor-made remediation actions to be applied for the components which are predicted to go "out-of-bound." The technical solutions described herein provide various advantages relative to conventional approaches which are reactive in nature (e.g., which only take action after components are already "out-of-bound") and thus result in downtime and sub-optimal utilization of resources. As the behavior of components of VMs or other IT assets of an IT infrastructure can be very dynamic, it is difficult, costly and ultimately not effective to use manual or static rule-based approaches and processes.

The technical solutions described herein provide an application ecosystem and framework that is built by leveraging state-of-the-art AI algorithms and ML models to address dynamic out-of-bound component scenarios, which advantageously reduces downtime and sub-optimal utilization of resources. The novel approaches described herein for leveraging AI algorithms and ML models achieves a state of operational excellence in an infrastructure ecosystem. The application ecosystem and framework is able to proactively forecast characteristics, behavior and states of processes which run on VMs or other IT assets of an IT infrastructure well in advance, and take appropriate remediation action on those VMs or other IT assets which are on a trajectory to flip into a sub-optimal state. The technical solutions provide a proactive approach which identifies issues before the VMs or other IT assets flip to the sub-optimal state, by executing subprocesses or other remediation actions that are recommended by a reinforcement framework of AI/ML predictive models. The application ecosystem and framework described herein provides a self-healing environment for an IT infrastructure which insures against downtime, and thereby assures business continuity and overall operational excellence.

The application ecosystem and framework includes functionality for understanding the behavior of components of VMs (or other IT assets of an IT infrastructure) from past historical facts and data, for identifying significant features and critical factors influencing the state or behavior of the components, for predicting the behavior of the components in alignment with actual behavior, and for initiating remediation actions well in advance. The technical solutions described herein include learning patterns from past historical facts and data using various state-of-the-art algorithms. The technical solutions build and integrate predictive AI and ML models (e.g., regression models, Facebook Prophet, Autoregressive Integrated Moving Average (ARIMA), seasonal ARIMA (SARIMA), etc.) in the application ecosystem and framework to identify critical components and their features that help to forecast the behavior/state of components well in advance in a dynamic manner. The technical solutions described herein also provide remediation functionality that helps to take appropriate remediation actions based at least in part on forecasted states of subprocesses.

VMs are key components in any computational and data infrastructure. An enterprise, for example, may operate an IT infrastructure with more than 100,000 VMs, and the number of VMS is constantly growing. Virtualization and hyperconvergence of IT infrastructure creates opportunities in management, but also opens up several challenges that are hard to troubleshoot, from network congestion due to noisy neighbors to random shifts in application response times due to uneven consumption of underlying computing resources creating peaks and valleys. A challenge is that problems of this kind will always be ahead of manual/rule-based processes.

Conventional approaches for handling VM issues are reactive in nature, and typically deal with VM issues related to utilization of resources (e.g., central processing unit (CPU), memory, disk space, etc.) that are causing downtime and sub-optimal utilization of resources in an IT infrastructure. Moreover, most of these issues are handled manually by support teams in a reactive manner. Such reactive solutions address the breakdown, but involve time and human resources. There is thus a need for an application ecosystem and framework that can help to proactively predict and forecast resource utilization in advance, in order to take appropriate auto-remediation actions to prevent vulnerable processes or components of VMs or other IT assets from flipping into sub-optimal performance states.

The reactive approach for understanding and resolving CPU, memory and disk space issues for VMs causes downtime and sub-optimal utilization of a resource pool within a VM cluster (e.g., a VM cluster running the VMware ESXi™ hypervisor) on which the VMs are hosted. While analyzing past incident data, it is observed that one of the most recurring incidents in VM infrastructure is the performance lag observed in software application responsiveness. The business needs and demands from software applications may vary from time to time, day to day, week to week, and sometimes across months. It is observed from the past data that most of the incidents pertaining to lag in the performance of software applications are seen at crucial periods when the software applications are handling higher transaction volumes to support business demands. On a further deep dive into the data, the root cause for the issue of "lag in performance" of software applications may be narrowed down and attributed to the underlying availability of memory or other types of resources allocated to a given VM on which a given software application is hosted.

Figure 3:
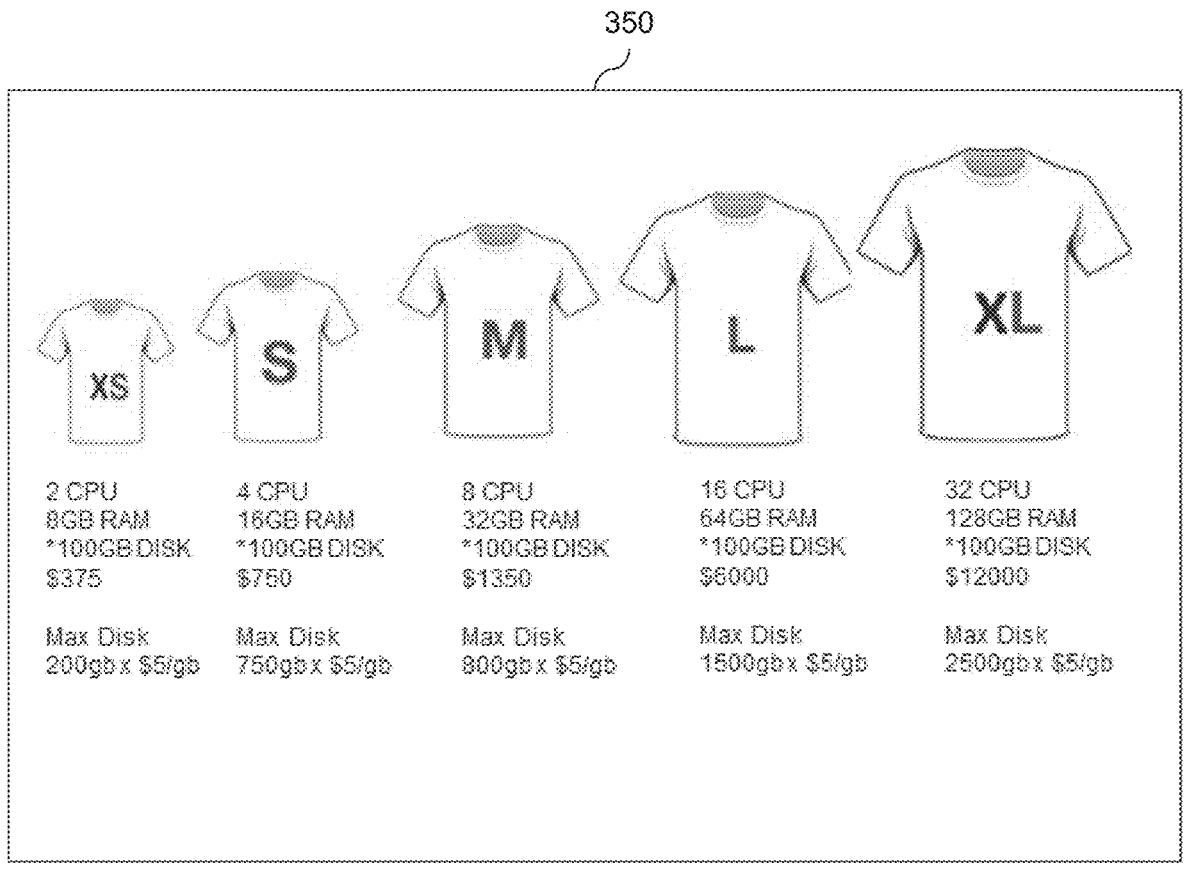
FIG. 3 shows a table and visualization of resource allocation to information technology assets using predefined resource allocation templates in an illustrative embodiment.

A support engineering or application team may allocate memory or other resources to a given VM at the time of provisioning the given VM based on a "guesstimate." Such an approach, however, commonly leads to overprovisioning. In some cases, resources may be allocated to VMs or other IT assets using a "T-shirt sizing" model illustrated in the table 300 and visualization 350 of FIG. 3. The "T-shirt size" chosen by the application team for a given VM may be based on the possible business needs that the application team envisions at the beginning of the business based on their visibility into future demands. The "T-shirt sizes" are examples of what are more generally referred to herein as resource allocation templates (e.g., predefined or configurable templates for how much of different types of resources are to be allocated to an IT asset). The current approach followed by the application team in choosing the "T-shirt size" for VM provisioning is not based on real-time data, and hence there are chances that the "T-shirt size" decided at the beginning of a project/business may not be the right fit as the project progresses into future states. The business needs and demands, for example, may be very volatile and hence having a fixed "T-shirt size" at all stages of the application lifecycle may not be the right choice to make. Having a dynamic real-time evaluation and forecast of the resources needs for the given VM would help the application team to ensure that their infrastructure is equipped with optimal resources and at the same time ensure seamless business continuity without hampering business needs. The "T-shirt sizing" approach provides a way to standardize and understand the environment based on well-known and common resource needs (e.g., CPU, RAM, based disk, max disk, etc.).

Signs of performance degradation for software applications are observed as memory and other resource demands start to mount and memory or other resource consumption exceeds the allocated memory or other resources. Thus, the approach of "T-shirt sizing" at the time of VM resource provisioning is not necessarily the correct fit for current demand. While increasing memory or other resources allocated to a VM can restore application performance, this reactive approach for remediating memory or other resource demand is not optimal. Running VMs with high memory resources may address the condition of performance lag, but overprovisioning of memory resources at all times is a drain on the memory pool of a VM cluster (e.g., an ESXi cluster), which leads to sub-optimal utilization of resources in the VM cluster. A VM cluster (e.g., an ESXi cluster) may be multi-tenant, and a single VM could be causing "fit issues." Illustrative embodiments provide technical solutions which improve the fit evenly across VMs within a VM cluster, and potentially across multiple VM clusters. Each ESXi cluster is multitenant, which means that it hosts multiple VMs each with their own resource demands. Indiscriminate scaling of resources for a single VM on an ESXi or other VM cluster will have an impact on other tenants running on the same cluster sharing the same hardware resource pool. Thus, it is important and critical to be precise and have a real-time assessment of demand to decide on the right "T-shirt size" or other resource allocation so that it fits well into the ecosystem to optimally utilize resources of a resource pool across all hosted VMs on an ESXi or other VM cluster.

To address these and other scenarios in a proactive manner, the technical solutions described herein provide an automated, predictive, customized and personalized solution for resource allocation for VMs or other types of IT assets such that utilization of memory and other resources is forecasted in advance and accordingly scaled up or down based on needs. This ensures improved performance of software applications which run on the VMs or other IT assets, as well as improved utilization of a resource pool for an ESXi or other VM cluster. Based on a VM's forecast of resource needs and its current "T-shirt size," the AI/ML models described herein will recommend and suggest a "T-shirt size" which is the right fit for software applications to meet current business needs and the demands of the near future. The technical solutions described herein thus help VMs and software applications running thereon to strike a balance of resource demands of VMs to optimally utilize the resource pool of an ESXi or other VM cluster.

Figure 4:
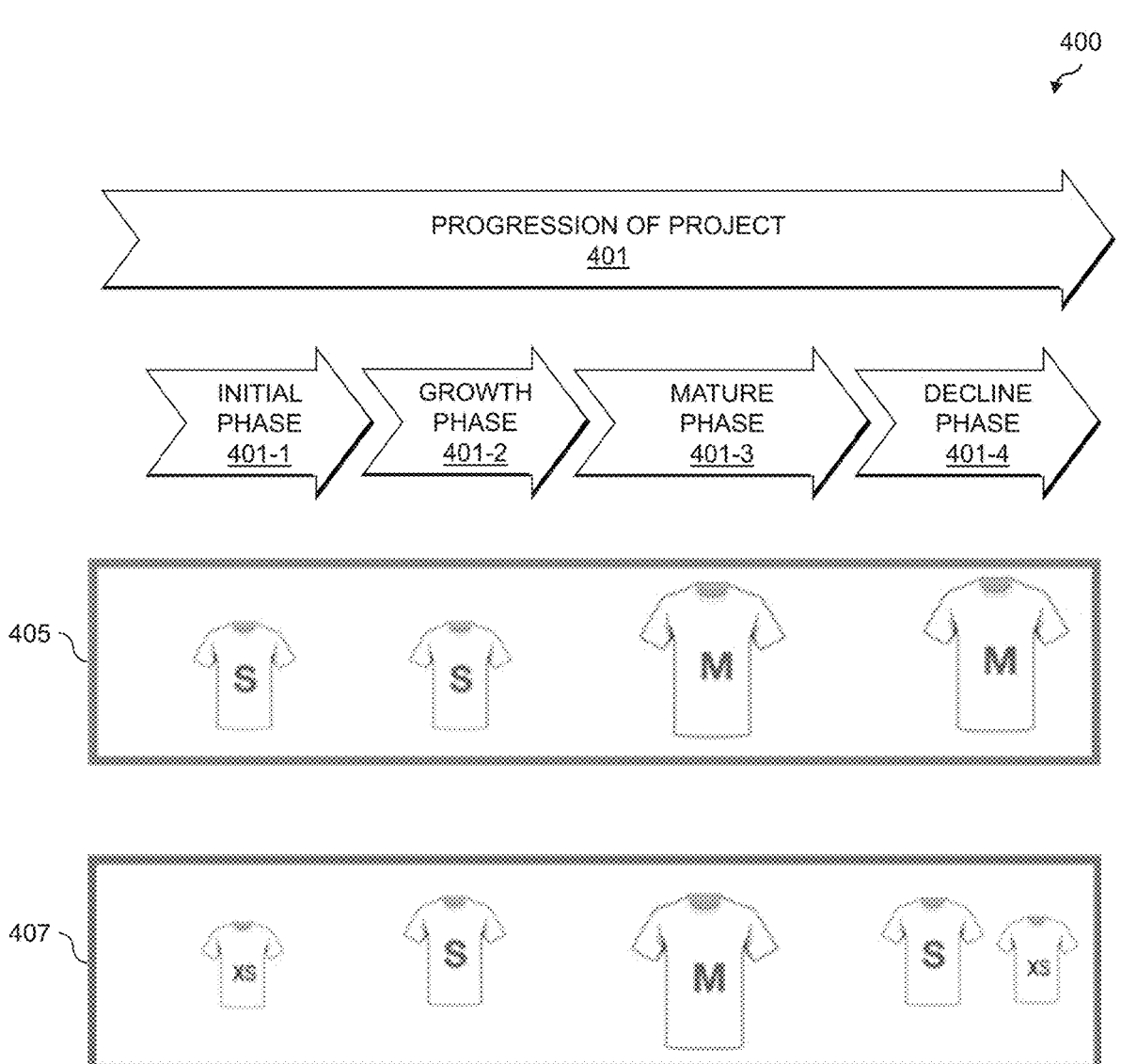
FIG. 4 shows changes in allocation of resources to information technology assets using predefined resource allocation templates in an illustrative embodiment.

FIG. 4 shows a schematic representation 400 for a "T-shirt sizing" method of assigning resources to VMs or other IT assets across the progression of a project 401 from an initial phase 401-1, to a growth phase 401-2, to a mature phase 401-3, and to a decline phase 401-4. Hardware resource demand increases from the initial phase 401-1 to the growth phase 401-2, and from the growth phase 401-2 to the mature phase 401-3. Hardware resource demand decreases, however, from the mature phase 401-3 to the decline phase 401-4. The visualization 405 illustrates a conventional approach, where the "T-shirt size" starts at small in the initial phase 401-1, stays at small in the growth phase 401-2, increases to medium in the mature phase 401-3, and stays at medium in the decline phase 401-4. This, however, is not optimal as the hardware resource demand decreases from the mature phase 401-3 to the decline phase 401-4. Further, the initial allocation of resources in the initial phase 401-1 may be overprovisioned. The visualization 407 illustrates the novel and intelligent approach described herein, where the "T-shirt size" starts at extra-small in the initial phase 401-1, moves to small in the growth phase 401-2, moves to medium in the mature phase 401-3, and then moves to small and extra-small in the decline phase 401-4.

Lots of incidents may be created in the past related to VMs not being responsive, and the root cause for such incidents may be drilled down to the unavailability of resources such as CPU, disk space, memory, etc. which are provisioned along with VMs. It is observed that CPU demand correlates with the age of software applications which run on VMs. This is because, as the software applications mature, more features, tasks, jobs and functionalities are added as the business needs continue to evolve. In addition, as software applications mature and get older, it is observed that the amount of data being processed and stored by VMs on which the software applications run shows an increased trend. The trend in the resource requirements that are observed in each VM cannot necessarily be generalized for all VMs in a given VM cluster, and on the same lines a single remediation solution prescribed for all the VMs in the given VM cluster is not optimal. If an approach goes one-by-one prescribing resource remediation needs for all the VMs in the given VM cluster, then the resource pool of the given VM cluster may be sub-optimal which adds cost. The resource needs (e.g., CPU, disk space, memory, etc.) for a given VM depend on the software applications hosted on the given VM, the functionalities of the software applications hosted on the given VM, the purpose of the software applications hosted on the given VM (e.g., computational needs, storage needs, etc.), the volume of business or other transactions that happen using the software applications hosted on the given VM, etc.

Manually monitoring a large number of VMs (e.g., thousands or hundreds of thousands of VMs) or other IT assets is not feasible. Thus, an intelligent solution is needed for forecasting the resource needs of VMs or other IT assets, and for automatically allocating the required resources to meet the needs of software applications which run on the VMs or other IT assets while at the same time striking a balance on the resource pool (e.g., of a VM cluster on which the VMs run). The technical solutions described herein provide a framework for monitoring VMs in an ecosystem and predicting resource needs at the individual VM level. The predictive framework utilizes information pertaining to the currently used VM "T-shirt size" (or other indication of allocated resources) along with forecasts of future demands to suggest and recommend the best "T-shirt size" (or other allocation of resources) for different VMs to ensure smooth functioning of software applications hosted thereon while at the same time striking a balance to ensure optimum or improved utilization of resources in a resource pool for the VM cluster.

The technical solutions described herein provide functionality for dynamic hardware resource bound prediction and remediation using auto-discovery of predictor features (e.g., parameters that identify characteristics of a condition to be optimized), and execution of subprocesses that will optimize conditions by applying a custom reinforcement framework that minimizes suboptimal outcomes. The technical solutions may be applied in a global data center IT management framework, as an additional data source as well as providing a proactive monitoring ecosystem.

Figure 5:
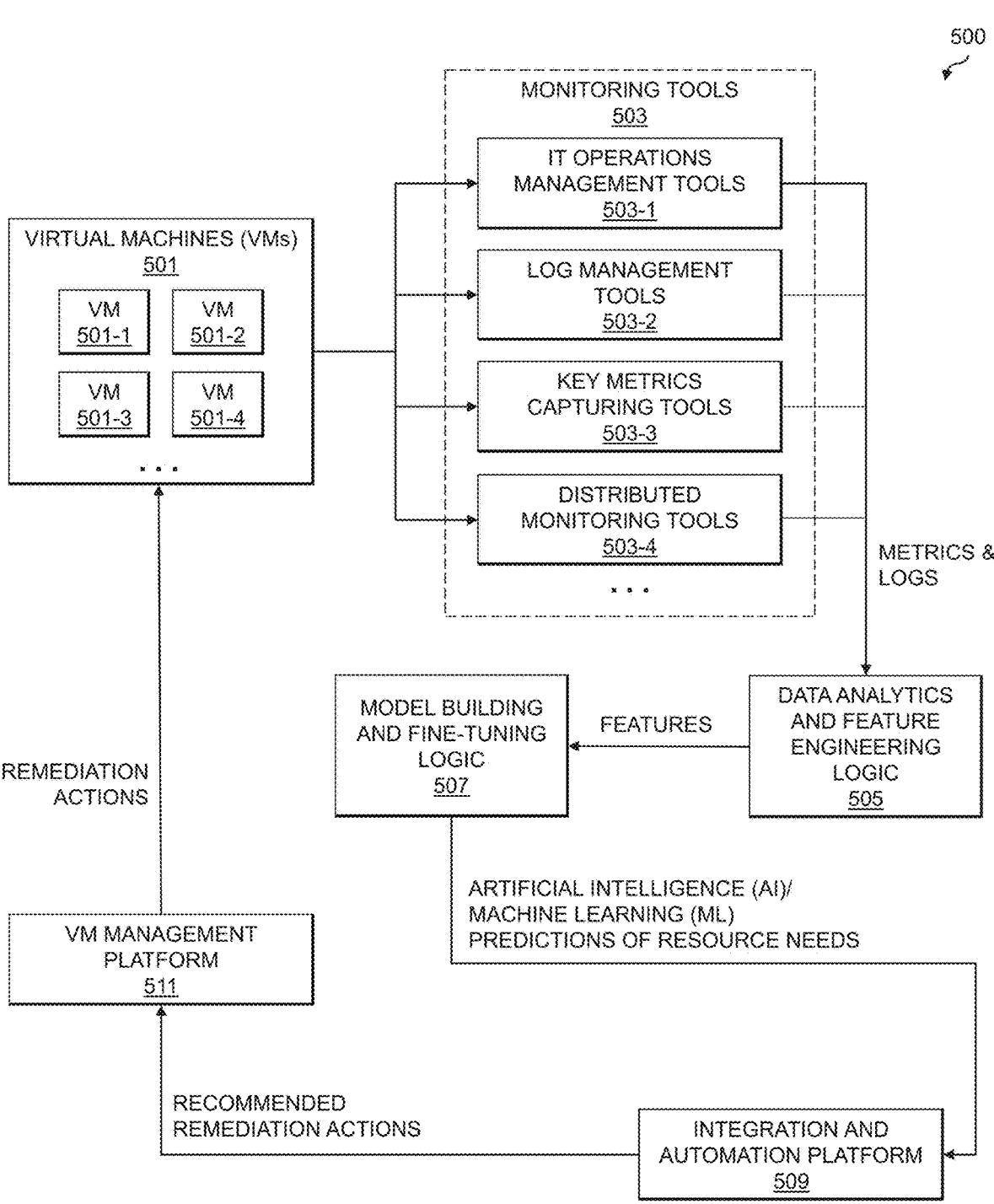
FIG. 5 shows an artificial intelligence framework configured for dynamic resource allocation for information technology assets in an illustrative embodiment.

FIG. 5 shows an AI framework 500, including a set of VMs 501 (including VMs 501-1, 501-2, 501-3, 501-4, etc.) which are managed by a VM management platform 511. The VMs 501, during operation, provide various information to a set of monitoring tools 503. The set of monitoring tools 503 include IT operations management tools 503-1 (e.g., VMware vRealize® Operations™), log management tools 503-2 (e.g., VMware vRealize® Log Insight™), key metrics capturing tools 503-3, and distributed monitoring tools 503-4 (e.g., Zabbix®), etc. The monitoring tools 503 obtain and/or generate various metrics and logs which are provided to data analytics and feature engineering logic 505, which generates a set of features from the metrics and log data. The generated features are provided to model building and fine-tuning logic 507, which utilizes one or more AI/ML models to generate predictions of resource needs for the VMs 501 (e.g., the right "T-shirt size" for different ones of the VMs 501). Such predictions are provided to an integration and automation platform 509 (e.g., Stackstorm®) which determines recommended remediation actions (e.g., changes to the "T-shirt size" assigned to different ones of the VMs 501). Such recommendations are provided to the VM management platform 511 (e.g., VMware vCenter®), which selects and applies remediation actions (e.g., "T-shirt size" changes) to different ones of the VMs 501.

The AI framework 500 provides various capabilities, including the ability to understand the behavior of different components of the VMs 501 based on metrics and logs captured or generated using the monitoring tools 503. The monitoring tools 503 are configured to dynamically capture the parameters that need to be optimized, based on the types of resources assigned to the VMs 501 and the software applications running on the VMs 501. The data analysis and feature engineering logic 505 and the model building and fine-tuning logic 507 are configured to automatically detect the parameters or features to utilize and then build dynamic AI/ML optimization models for each component (e.g., each of the VMs 501) in the VM infrastructure. The integration and automation platform 509 and VM management platform 511 perform automatic remediation to achieve a state of self-healing with no downtime.

The AI framework 500 is smart enough to learn from past data, which includes machine logs and other relevant data sources. The model building and fine-tuning logic 507 are smart enough to learn and dynamically identify the model parameters for one or more AI/ML models that need to be fine-tuned and optimized for each and every one of the VMs 501 (e.g., which may be part of an ESXi or other VM cluster), and use such AI/ML models to suggest appropriate remediation actions at the individual VM level, thereby preventing the VMs 501 from running out of resources (e.g., CPU, memory, disk space, etc.). The intelligent solution also takes care of efficiently utilizing the resource pool to achieve operation excellence.

The monitoring tools 503 are configured to capture metrics and logs from the VMs 501, and to build a data repository. Machine logs and performance metrics for any given one of the VMs 501 (e.g., VM 501-1) are captured at various granularities and different intervals of time in different data repositories provided by different ones of the monitoring tools 503. Such data repositories may include a vRealize Log Insights (vRLi) data repository provided by the IT operations management tools 503-1 implementing a VMware vRealize® Operations™ system, a vRealize Operations (vROPs) data repository provided by the log management tools 503-2 implementing a VMware vRealize® Log Insight™ system, a storage resource manager (SRM) data repository provided by the key metrics capturing tools 503-3, etc. In addition to these logs and metrics, the AI framework 500 also monitors certain critical parameters via distributed monitoring tools 503-4 (e.g., the Zabbix® monitoring system). Data from these and other monitoring tools 503 play an important role for building AI/ML prediction models. Data from the monitoring tools 503 is processed and transformed to a format that is suitable for AI/ML tasks, and may be stored in a separate repository (e.g., an AI/ML data repository) from which data science activity is initiated. These data processing and collating workflow pipelines may be totally automated thereby avoiding manual intervention.

Figure 6:
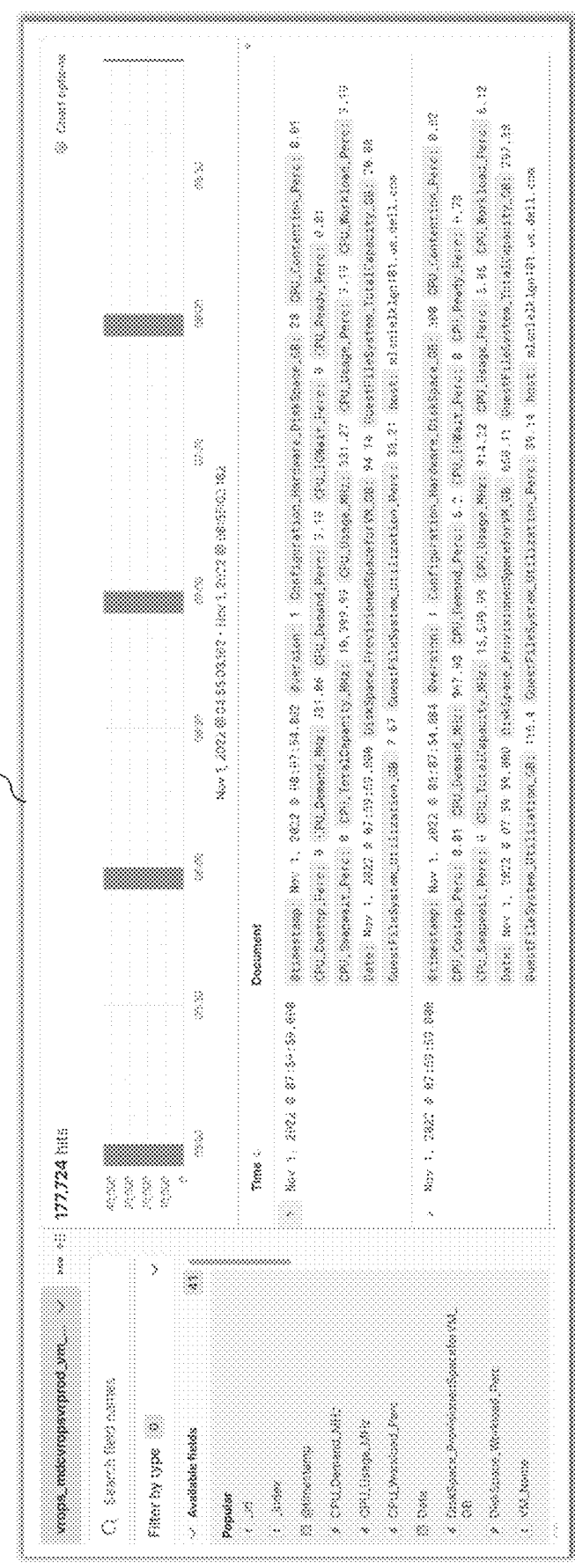
FIG. 6 shows a visualization of logs and metrics collected for an information technology asset in an illustrative embodiment.

A description of the steps involved in extracting metrics data from vROPs through one or more application programming interfaces (APIs) will now be described. Such steps include: completing authorization and getting an authorization token; getting a list of all VM identifiers (IDs) for which metrics are needed; getting the metrics and their values for the required VMs based on the granularity needed; and storing the metrics data in the AI/ML data repository. Examples of key metrics extracted from vROPs include: CPU Co-stop, CPU Demand, CPU Ready, CPU Usage, CPU Swap Wait, CPU Total Capacity, Memory Usage, Memory Contention, Memory Compressed, Memory Utilization, Memory Total Capacity, Memory Workload, Memory Guest Demand, Diskspace Provisioned Space for VM, Diskspace Workload, and Guest File System Utilization. FIG. 6 shows a snapshot 600 of VM data ingested using the ElasticSearch search engine. Similarly, data may be extracted from other data sources like vRLi, SRM, Zabbix®, etc. through different APIs.

Once the metrics and log data are stored in the AI/ML data repository, the data analysis and feature engineering logic 505 performs data analysis to understand the data and perform feature engineering to finalize on the features that need to be considered for modeling. VM data is analyzed on multiple aspects to understand the past behavior of the VMs 501, so that resource demands in the future may be predicted. Trend, seasonality and noise are accounted for by decomposing the time series metric data and performing correlation and auto-correlation plots to estimate different seasonal parameters. The data analysis includes data cleansing activities like handling missing values and removing outliers, performing univariate analysis and leveraging statistical methods to understand data behavior, decomposing time series data to multiple components to understand seasonal and non-seasonal behavior, and plotting correlation plots to estimate different parameters.

Figure 7:
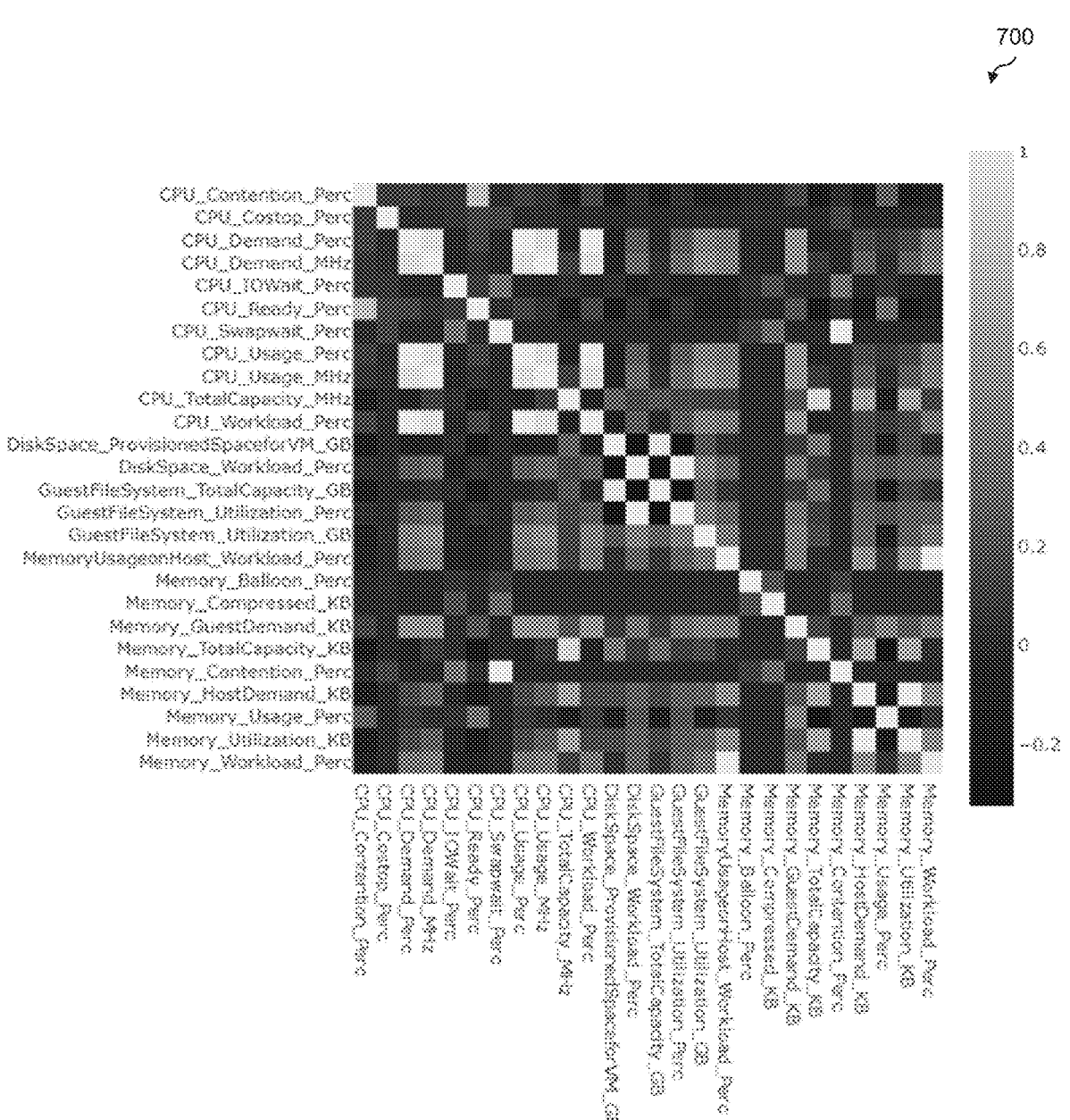
FIG. 7 shows a correlation plot for different metrics collected for an information technology asset in an illustrative embodiment.
Figure 10A:
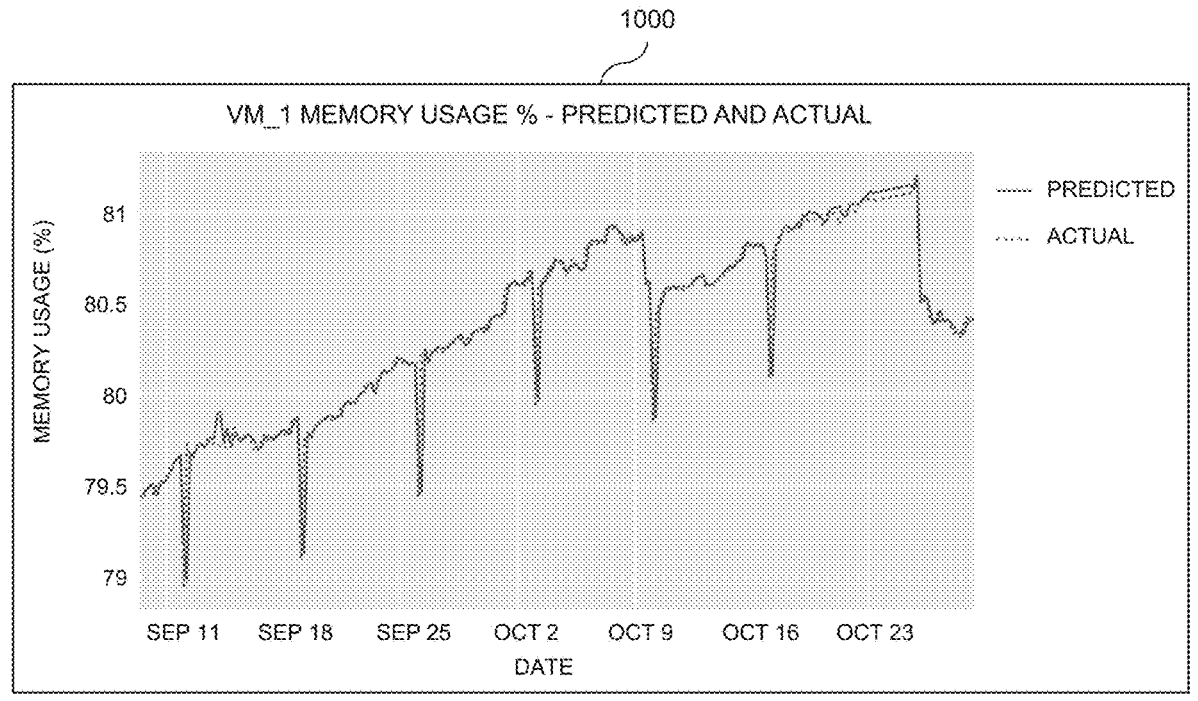
FIGS. 10A-10F show plots of actual and predicated utilization of resources by information technology assets in an illustrative embodiment.
Figure 10B:
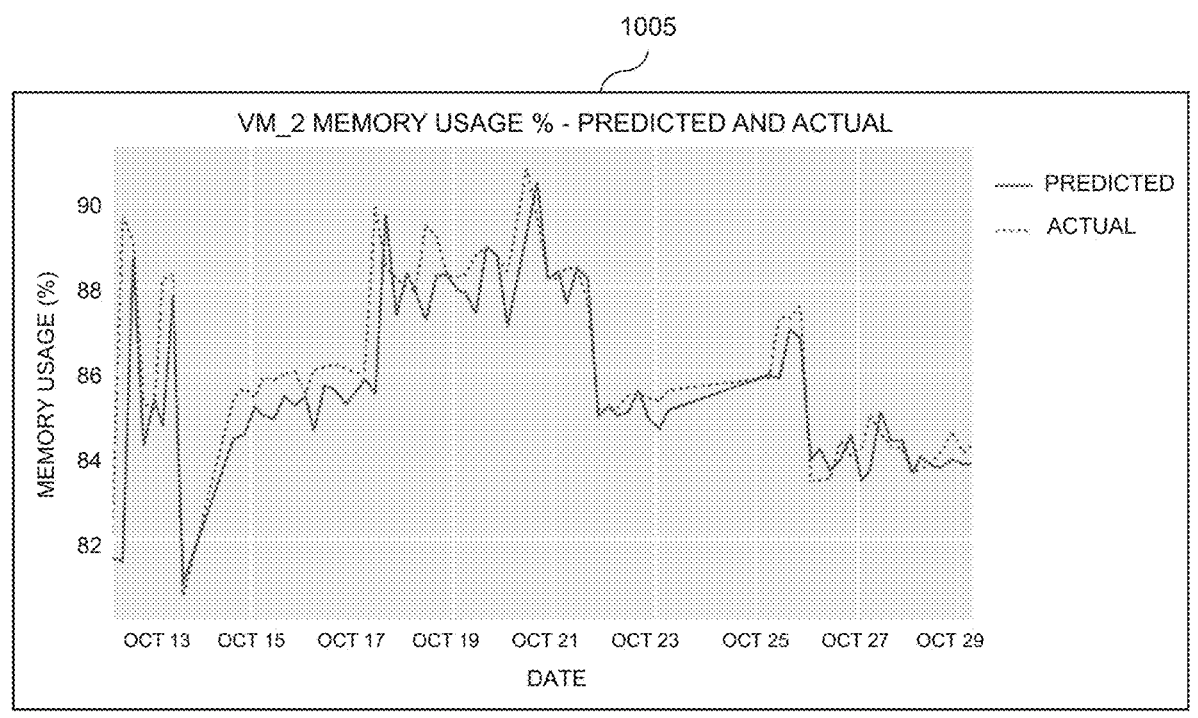
Figure 10C:
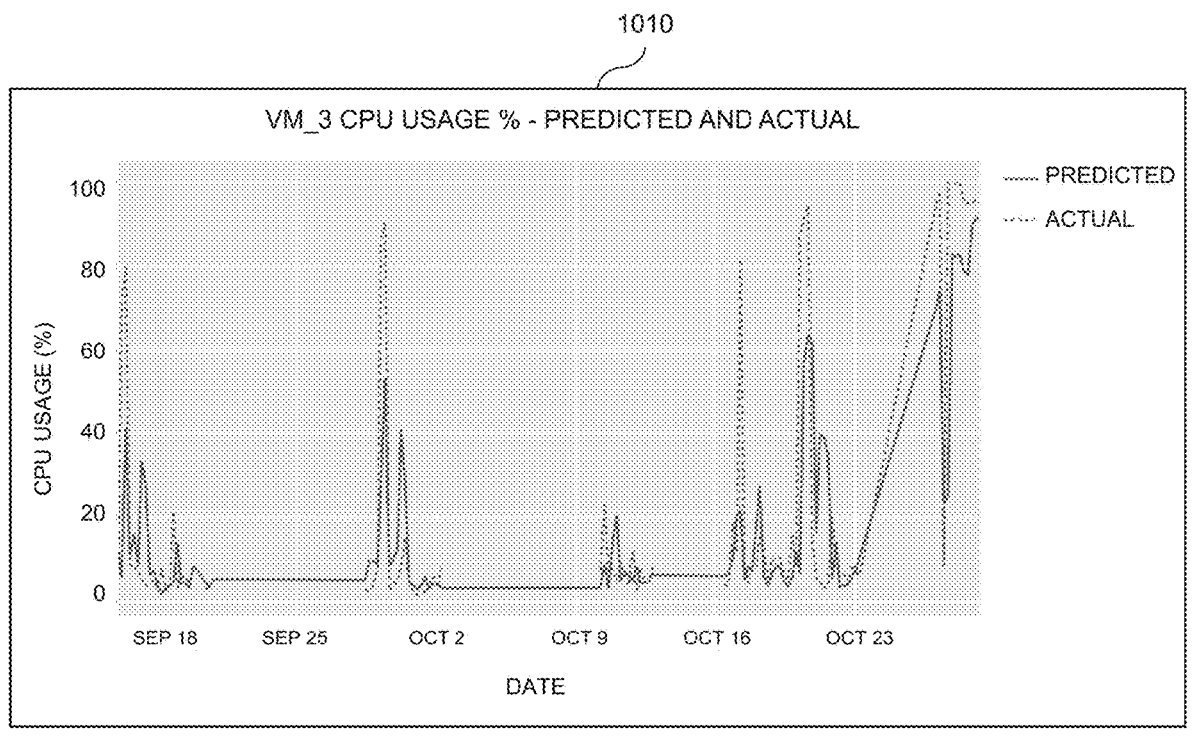
Figure 10D:
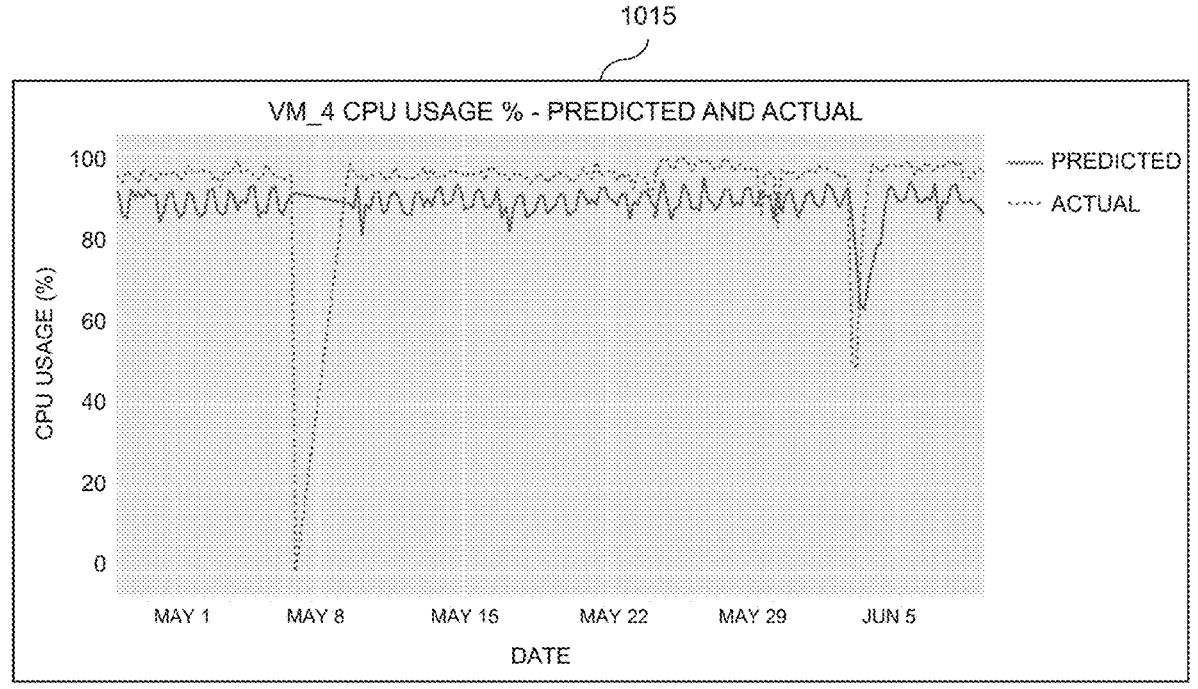
Figure 10E:
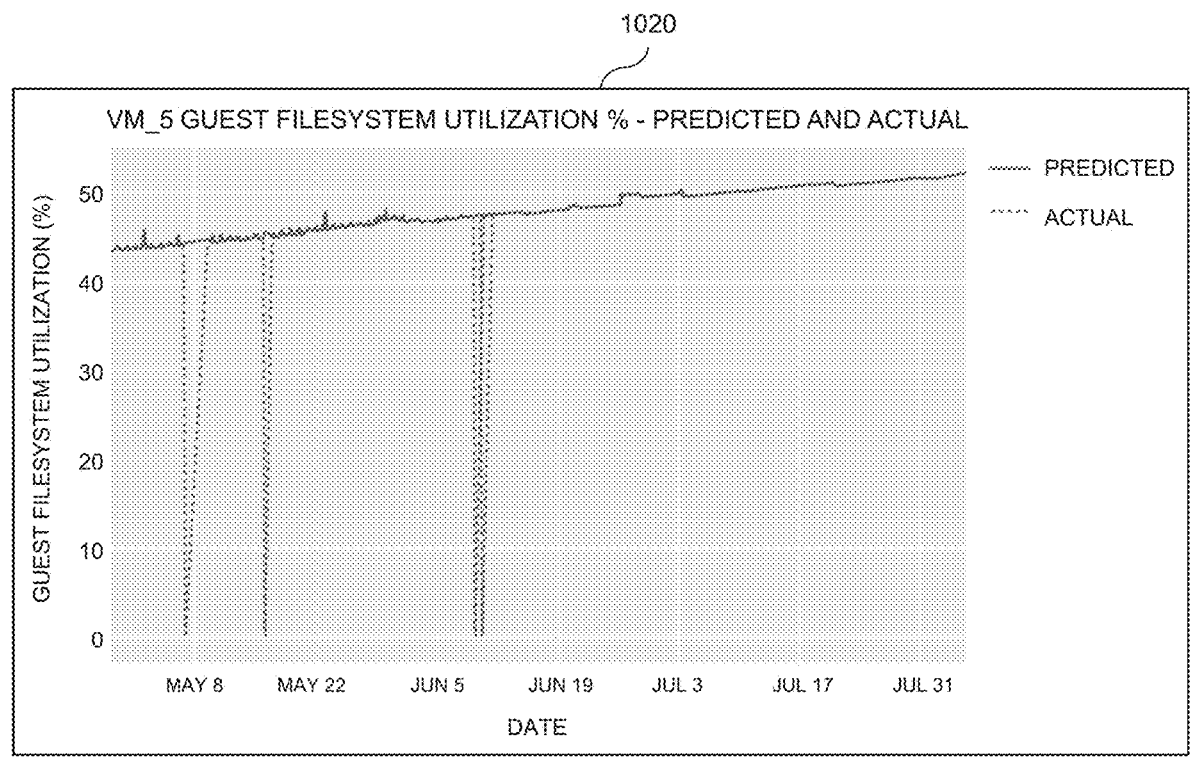
Figure 10F:
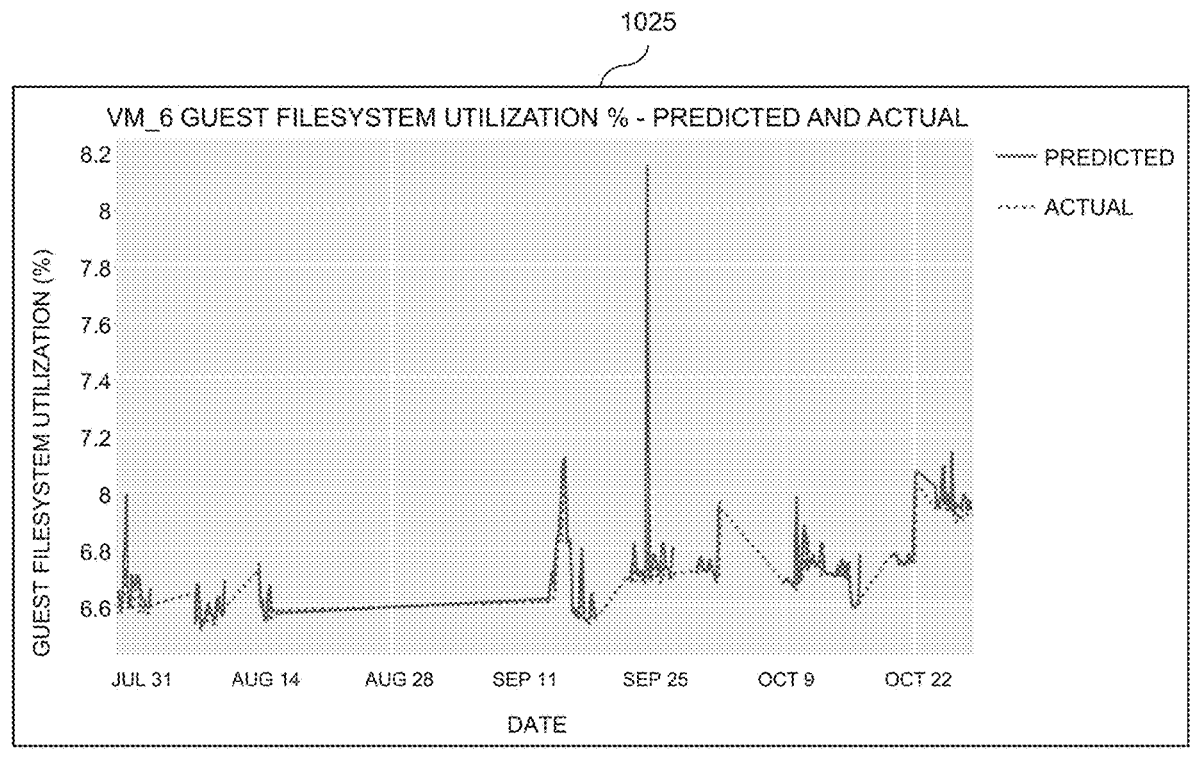

Once the data analysis is performed to obtain a good understanding of the past behavior of the VMs 501, different AI/ML models are analyzed to identify key features needed for modeling. Various approaches may be used to find important and relevant features for modeling. Statistical approaches like Pearson's coefficient and Chi-Squared test along with Subject Matter Expert (SME) input are leveraged for feature selection. The feature selection may include performing bivariate/multivariate analysis and plotting correlation matrix to understand relations, finding correlated features using a Pearson Correlation approach and eliminating related features in analysis, checking for multicollinearity and performing related action items, applying wrappers methods like Forward Feature selection to find important features for modeling, and using ensemble methods like Random Forest for feature selection. FIG. 7 shows a snapshot of a correlation plot 700 obtained using the data analytics and feature engineering logic 505. Based on the outputs from wrapper and ensemble methods, various important features may be selected for modeling. In some embodiments, the following features are selected based on the feature engineering analysis: CPU Contention, CPU IO Wait, CPU Usage, CPU Demand, CPU Co-stop, Memory Contention, Memory Usage, and Guest FileSystem Utilization.

The model building and fine-tuning logic 507 is configured to generate predictions (e.g., resource needs of the VMs 501) from the AI/ML models with the features selected by the data analytics and feature engineering logic 505. Once the features are selected, the next step involves selection of AI/ML algorithms that suits the use case. Time series models and deep learning models are considered. Time series models include Auto Regressive Integrated Moving Average (ARIMA), Seasonal Auto Regressive Integrated Moving Average (SARIMA), Seasonal Auto Regressive Integrated Moving Average with exogenous factors (SARIMAX), Vector AutoRegression (VAR), etc. Deep learning models include Long Short-Term Memory (LSTM), Facebook Prophet (FB Prophet), etc. During model training, the AI/ML models are finalized and different configuration items/parameters which are specific to a given AI/ML model are finalized to achieve best predictive results. In the case of time series models, the following configuration parameters are finalized: non-seasonal components, seasonal components, and exogenous components. In the case of deep learning models, the following configuration parameters are finalized: learning rate, n_lags n_estimators, and max_depth.

Model training may be performed for some or all of the above-mentioned predictive algorithms. This effort helps to select the final predictive algorithm that best represents a particular use case. The selection of the final model may be based on the prediction performance at each individual VM level. The final model is further fine-tuned to select the best configuration parameters through cross-validation, with the fine-tuned final model being used for generating the predictions of future resource requirements for different ones of the VMs 501. In some embodiments, based on the data, model performance and use case business needs, a VAR model is used. Various approaches for VAR may be considered, including a VAR model without exogenous variables, a VAR model for multi-step forecasting without exogenous variables, a VAR model for multi-step forecasting with lag values as exogenous variables, and a VAR model for multi-step forecasting with dynamic selection of exogenous variables. Based on testing, some embodiments utilize the VAR model for multi-step forecasting with dynamic selection of exogenous variables.

The final prediction model is built using the entire historical data available for a given VM. The final model then predicts the resource needs with respect to CPU, memory, disk space and other resources for a number of future timesteps (e.g., the next few hours, days, etc.). The prediction results are stored in a database (e.g., a MongoDB) which is then leveraged for remediation actions as well as for model evaluation. In some embodiments, the AI/ML model predicts CPU usage percentage, memory usage percentage, and guest filesystem utilization percentage for each VM for a next n time steps (e.g., a next 5 hours). Based on the AI/ML model predictions, VMs are categorized into three different categories for each parameter. As an example, if predicted CPU usage percentage is less than 60% in the next 5 hours a VM may be marked as "Healthy", if the predicted CPU usage percentage is between 60-80% in the next 5 hours the VM may be marked as "Moderate Critical", and if the predicted CPU usage percentage is greater than or equal to 80% in the next 5 hours the VM may be marked as "Critical." Similar logic may be applied for other parameters (e.g., memory usage percentage, guest filesystem utilization percentage, etc.), although different threshold percentages may be used to categorize the VM as Healthy, Moderate Critical or Critical for other parameters. Further, there may be more than three different categories that the VM may be classified into.

FIG. 8 shows a snapshot 800 of AI/ML model prediction results for a VM (e.g., with a VM ID of VM_ID1 and a VM name of VM_NAME1) for three date ranges (e.g., three successive 5-hour increments) which may be stored in the database (e.g., the MongoDB). FIG. 9 shows a table 900 of data which may be stored in the database, which includes information similar to the entries of the snapshot 800.

FIGS. 10A-10F show respective plots 1000, 1005, 1010, 1015, 1020 and 1025 showing the comparison between AI/ML model predicted values and actual values for different parameters for different VMs. The plots 1000 and 1005 show the comparison between predicted and actual memory usage percentage for two different VMs (VM_1, VM_2). The plots 1010 and 1015 show the comparison between predicted and actual CPU usage percentage for two different VMs (VM_3, VM_4). The plots 1020 and 1025 shows the comparison between predicted and actual guest filesystem utilization percentage for two different VMs (VM_5, VM_6).

An objective of the AI framework 500 is to identify when a VM is predicted to become "Critical" and to find out transitions between different categories or states (e.g., "Healthy" to "Critical", "Moderate Critical" to "Critical", etc.) so that appropriate remediation action can be performed. FIG. 11 shows confusion matrix tables 1100, 1105 and 1110 summarizing model performance for each of the three resource metrics (e.g., CPU usage, memory usage, disk space utilization) for the last six months for all VMs 501 (or other IT assets in an IT infrastructure). The confusion matrices in the tables 1100, 1105 and 1110 explain how many times the AI framework 500 predicted that the VMs would enter the Healthy, Moderate Critical and Critical states with respect to each of the resource metric parameters for each 5-hour span, compared with actual values of the VMs entering the Health, Moderate Critical and Critical states. FIG. 12 shows a table 1200 summarizing different performance measures of the AI framework 500 for each of the resource metric parameters. The performance measures include: accuracy, or how many of the VM status/states (e.g., Healthy, Moderate Critical, Critical) are correctly predicted by the model; precision for critical status (e.g., for all the VM status/states predicted as Critical by the model, how many of those predictions are correct); recall for critical status (e.g., among the VMs having Critical status, how many of them have been precited as Critical by the model); and F1 score, defined as the harmonic mean of precision and recall.

Figure 13:
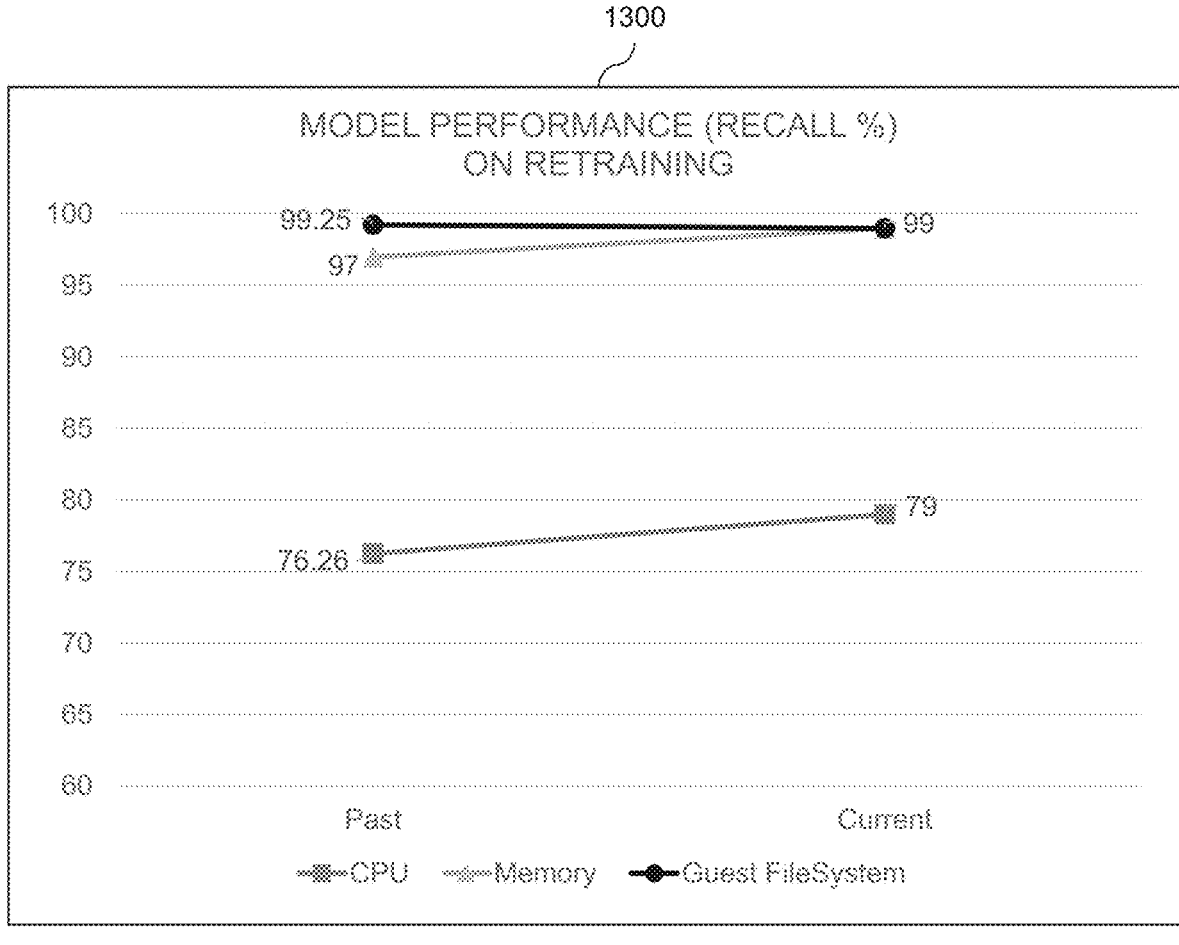
FIG. 13 shows a plot illustrative machine learning model performance for different resource metrics in an illustrative embodiment.

In order for the predictive model to be self-sustainable, the AI/ML model should be retrained over time. The AI framework 500 leverages patterns observed from new recent data, by running a model retraining task periodically (e.g., on a weekly basis). In addition to such periodic retraining of the model, the AI framework 500 also periodically (e.g., on a monthly basis) re-evaluates the model selection algorithms to ensure that the efficacy of the selected model algorithm is progressive and best for the given dataset. Activities that are performed as part of the periodic model retraining and model re-evaluation effort will now be described. As part of the model retraining process, the models are retrained and fine-tuned to find the best configuration parameters for the model. The configuration parameters may be stored in a configuration file, and the same parameters may be used for an entire period or interval (e.g., an entire week). The model re-evaluation selection includes model selection and model fine-tuning. FIG. 13 shows a graph 1300 depicting the performance gain by implementing retraining and re-evaluation of the model over a period of time.

The AI framework 500 also has the ability to automatically consider new VMs which get added to the IT infrastructure as they get provisioned. For a new VM to be part of the model building and prediction, the new VM should have a minimum volume of data (e.g., historical data) for the model to identify patterns to forecast the future trends. The process of model retraining and model re-evaluation may be automated so that the AI framework 500 can achieve a state of self-learning and self-learning with bare minimum manual intervention. In some embodiments, the AI/ML model predicts resource needs in terms of different resource parameters (e.g., CPU, memory, disk space, etc.) for each VM configured in the IT infrastructure. Based on a given VM's current "T-shirt size" and forecasted resource needs, the AI framework 500 recommends the best "T-shirt size" for the given VM. The recommendation from the AI framework 500 will run through a set of validation steps before it triggers an auto-remediation process, which would then resize the VM resources accordingly. In a scenario where the validation steps decide not to perform auto-remediation, a notification (e.g., via email, messaging, etc.) would be sent to authorized users (e.g., owners of the VMs) to validate the AI/ML recommendation and then take appropriate action. The decisions made by the authorized users will be fed back to the AI framework 500 to retrain and learn from such scenarios, which will help the model to learn and predict such scenarios when encountered in the future.

The AI framework 500, as noted above, is configured to automatically perform remediation actions on the VMs 501. The auto-remediation process involves a set of proactive corrective actions that are taken based on the prediction results by the AI/ML model. The remediation process involves a set of actions or a workflow that needs to be triggered to either scale up or scale down resources based on the recommendations from the AI/ML model. The remediation process, for example, may involve a set of scripts (e.g., Python scripts) that get called in a specific sequence to be executed to achieve a desired remediation action. The auto-remediation action process also has its own checks and balances before remediation actions are executed. Such checks and balances are put in place to negate undesirable effects due to any false positive AI/ML predictions. The checks and balances may include evaluating the difference of the magnitude between the current resource state of the VM and the predicted resource need state of the VM. If the deviation is far apart (e.g., based on a predefined threshold), then the system does not initiate an auto-remediation process/workflow and instead triggers a notification to a SME or other authorized user to evaluate the prediction and take appropriate action. The checks and balances may also include, on initiating auto-remediation action (e.g., resource scaling) based on the prediction results, continuously monitoring the VM for the next couple of hours or days to ensure that the system is stable after the execution of remediation action. The checks and balances may further include, if the VM performance is negatively impacted by auto-remediation during the monitoring period, taking a set of actions that get triggered to restore or roll back the VM to its original state and also send alerts to a SME or other authorized user for manual evaluation. The remediation scripts may be tested and tried in various non-production and test environments before being deployed in a production environment.

Figure 14A:
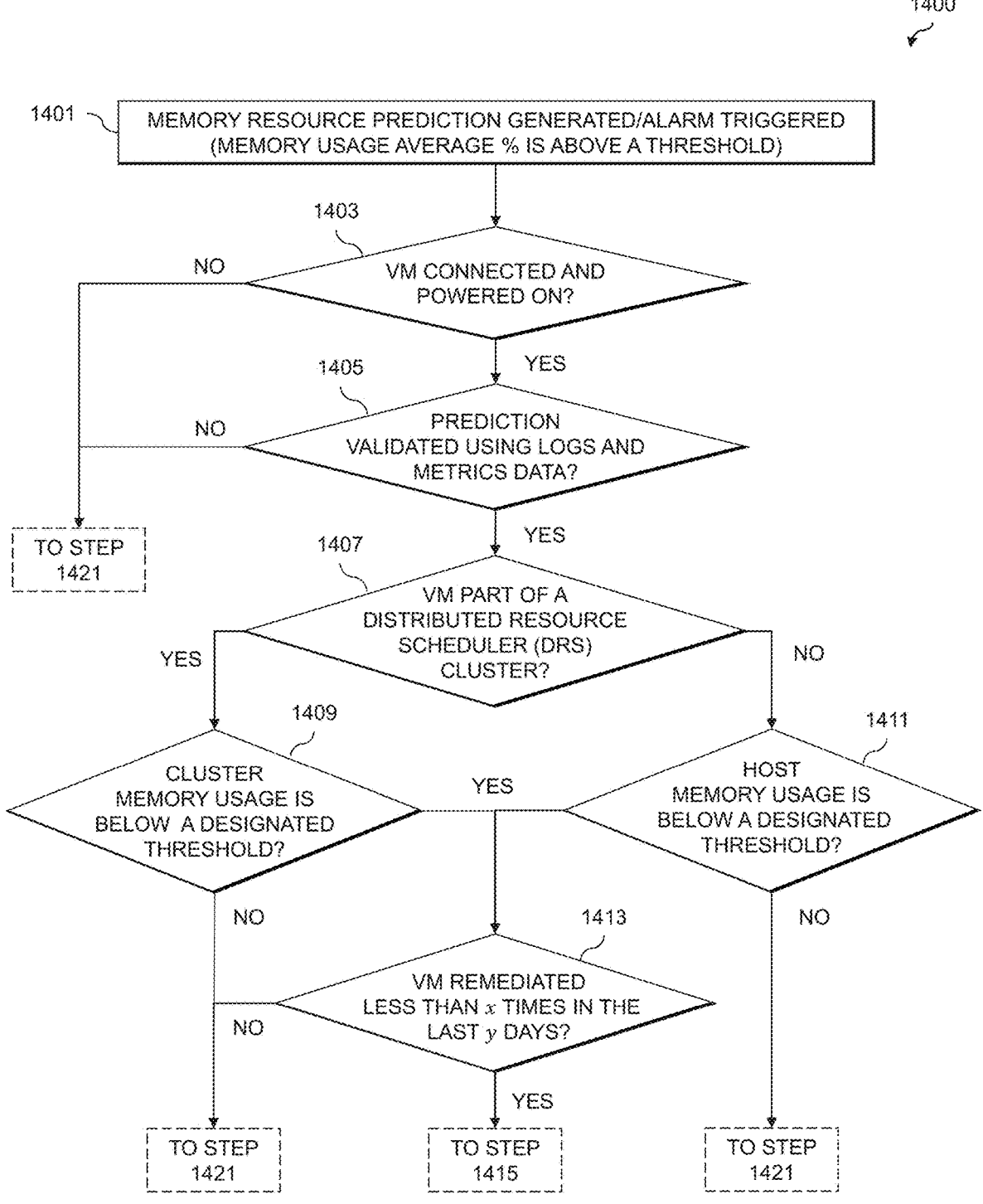
FIGS. 14A and 14B show a process flow for dynamic resource allocation for an information technology asset in an illustrative embodiment.
Figure 14B:
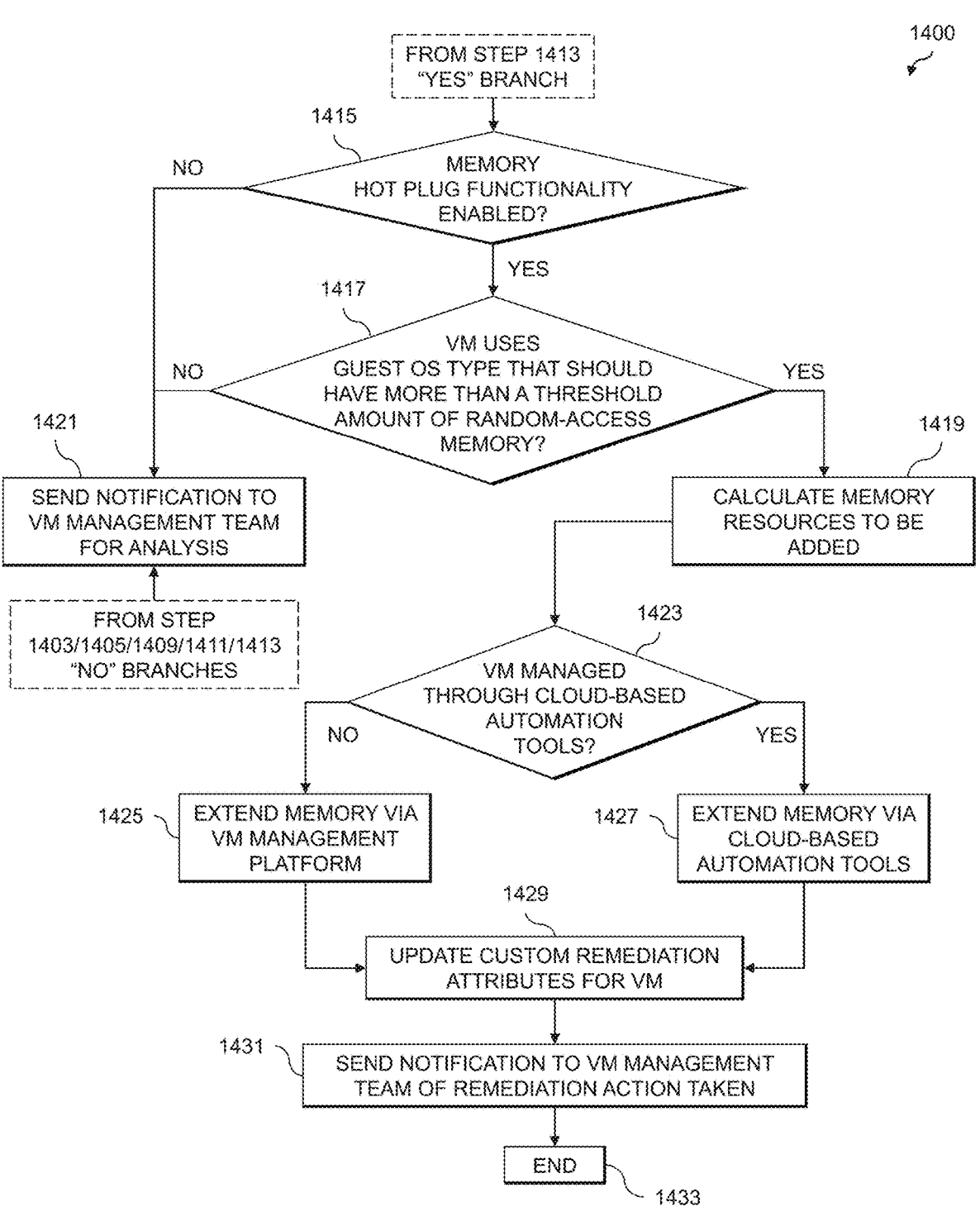

FIGS. 14A and 14B show a remediation workflow 1400 for a memory resource scale-up remediation action. Although described with respect to remediation actions related to memory resources for a VM, similar processing may be used for other types of resources (e.g., CPU, disk space, etc.) of VMs and other IT assets. As shown in FIG. 14A, the workflow 1400 begins in step 1401 where a memory usage prediction is generated, or an alarm is triggered (e.g., that predicted memory usage average percentage is above a designated threshold) for a given VM. In step 1403, a determination is made as to whether the given VM is connected and powered on. If the result of the step 1403 determination is yes, the workflow 1400 proceeds to step 1405 where a determination is made as to whether the prediction generated in step 1401 is validated using logs and metric data collected from the given VM. If the result of the step 1405 determination is yes, the workflow 1400 proceeds to step 1407 where a determination is made as to whether the given VM is part of a distributed resource scheduler (DRS)

cluster. If the result of the step 1407 determination is yes, the workflow 1400 proceeds to step 1409 where a determination is made as to whether the DRS cluster memory usage is below a designated threshold (e.g., 60%). If the result of the step 1407 determination is no, the workflow 1400 proceeds to step 1411 where a determination is made as to whether host memory usage is below a designated threshold (e.g., 60%). If the result of either the step 1409 or step 1411 determination is yes, the workflow proceeds to step 1413 where a determination is made as to whether the given VM has been remediated less than x (e.g., 3) times in the last y (e.g., 7) days.

As shown in FIG. 14B, if the result of the step 1413 determination is yes, the workflow 1400 proceeds to step 1415 where a determination is made as to whether the given VM has memory hot plug functionality enabled (e.g., an ability to dynamically add memory resources). If the result of the step 1415 determination is yes, the workflow 1400 proceeds to step 1417 where a determination is made as to whether the given VM uses a guest OS type (e.g., 64-bit Linux/Windows 7) that should have more than a threshold amount (e.g., 3 GB) of random-access memory (RAM). If the result of the step 1417 determination is yes, the workflow 1400 proceeds to step 1419 where the memory resources to be added to the given VM is calculated. If the result of the step 1403, 1405, 1409, 1411, 1413, 1415 or 1417 determination is no, the workflow 1400 proceeds to step 1421 where a notification is sent to a management team (e.g., which manages the given VM) for analysis. Following step 1419, a determination is made in step 1423 as to whether the given VM is being managed through cloud-based automation tools (e.g., vRA). If the result of the step 1423 determination is no, the workflow 1400 proceeds to step 1425 where the memory of the given VM is extended through a VM management platform (e.g., vCenter). If the result of the step 1423 determination is yes, the workflow 1400 proceeds to step 1427 where the memory of the given VM is extended through the cloud-based automation tools. In step 1429, custom remediation attributes for the given VM are updated. In step 1431, a notification is sent to the VM management team and/or a management team of the AI framework 500 of the remediation actions taken on the given VM. The workflow 1400 then ends in step 1433.

Understanding and identifying components and parameters of VMs (or other computing resources) that need to be optimized will vary significantly depending on the nature of the guest software applications that run on host infrastructure. No single solution can be generalized and applied on or to all problems with good results. The technical solutions described herein provide functionality for automatic detection of the components and generation or suggestions for tailored proactive solutions to impending problems (e.g., which could turn into an incident if they were not predicted and remediated appropriately in a timely manner) in an automated manner leveraging AI/ML techniques. The technical solutions are able to suggest or recommend the best "T-shirt size" or other resource allocation for VMs or other IT assets which will enable smooth performance of software applications which are hosted on the VMs or other IT assets, and which provides optimal utilization of resources from a resource pool (e.g., of a cluster on which the VMs or other IT assets run). Thus, the technical solutions described herein are able to help application or IT management teams by dynamically scaling the resources allocated to VMs or other IT assets based on the demand forecast, which will help to maintain an overall IT infrastructure or ecosystem in a stable condition and which meets the demands of the business in a seamless manner. The proposed model also brings benefits to the IT infrastructure management team by ensuring that limited resource pool in each cluster (e.g., in each ESXi cluster) is optimally utilized to ensure that the entire ecosystem is stable and that software applications hosted thereon run smoothly.

The technical solutions described herein provide various benefits, which can be extended to various components of VM objects (e.g., datastore, cluster, etc.), as well as other virtual computing resources (e.g., software containers) and physical computing resources, devices (e.g., network switches, routers, etc.) and other IT assets. Various examples will now be described which illustrate how the custom reinforcement framework works.

Software applications may be developed and deployed on VMs, with each of the VMs having its own compute, memory and data storage resources associated with it. The hardware resource (e.g., compute, memory, data storage, etc.) utilization by software applications that are deployed on a VM will vary based on the type of the tasks/jobs that are running on the VM. The number of jobs/tasks, as well as the type of the jobs/tasks that need to be run, is in turn based on the business needs for which the software applications are designed. There are times when the business demands or transactions of the software applications are very high, which leads to increased utilization of hardware resources (e.g., reaching up to 100% utilization or beyond). It is at this juncture (e.g., when demand exceeds the allocated resources) where software applications tend to lag, underperform and may eventually lead to failure.

The technical solutions described herein provide an ecosystem which dynamically identifies those VMs or other IT assets from an IT infrastructure whose trajectory is tending towards a state of sub-optimal efficiency. Once the vulnerable VMs or other IT assets are identified, the technical solutions then forecast the remediation required to prevent the vulnerable VMs or other IT assets from entering into sub-optimal performance states. Forecasting is based on historical facts (e.g., metrics, machine logs, etc.) along with the current state of the VMs or other IT assets. The tailor-made remediation solutions prescribed by the prediction system for the vulnerable VMs or other IT assets are thus allocated or scaled to achieve an optimal utilization of resources and thereby prevent any downtime or business discontinuity.

Consider a given VM having a new process set which is gradually utilizing all the resources of the given VM. When the new process utilizes all the resources of the given VM, the given VM will fail to respond and the new process will stop until resources are manually added by a support team. With the technical solutions described herein, the given VM may be continuously monitored with all its features captured to understand its behavior. The technical solutions will predict the need for additional resources after the new process has been set on the given VM, and remediation scripts will be automatically generated or selected for adding the resources needed to avoid the given VM entering a sub-optimal state. Thus, the new process will not negatively affect performance of the given VM.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for proactive adjustment of resource allocation to IT assets based on predicted resource utilization will now be described in greater detail with reference to FIGS. 15 and 16. Although described in the context of system 100, these platforms may also be used to implement at least portions of other information processing systems in other embodiments.

Figure 15:
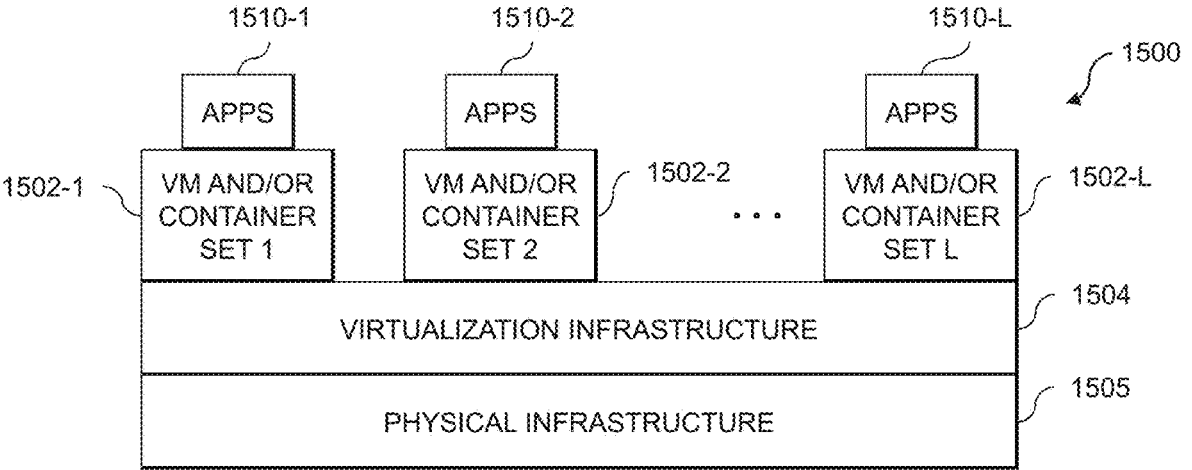
FIGS. 15 and 16 show examples of processing platforms that may be utilized to implement at least a portion of an information processing system in illustrative embodiments.
Figure 16:
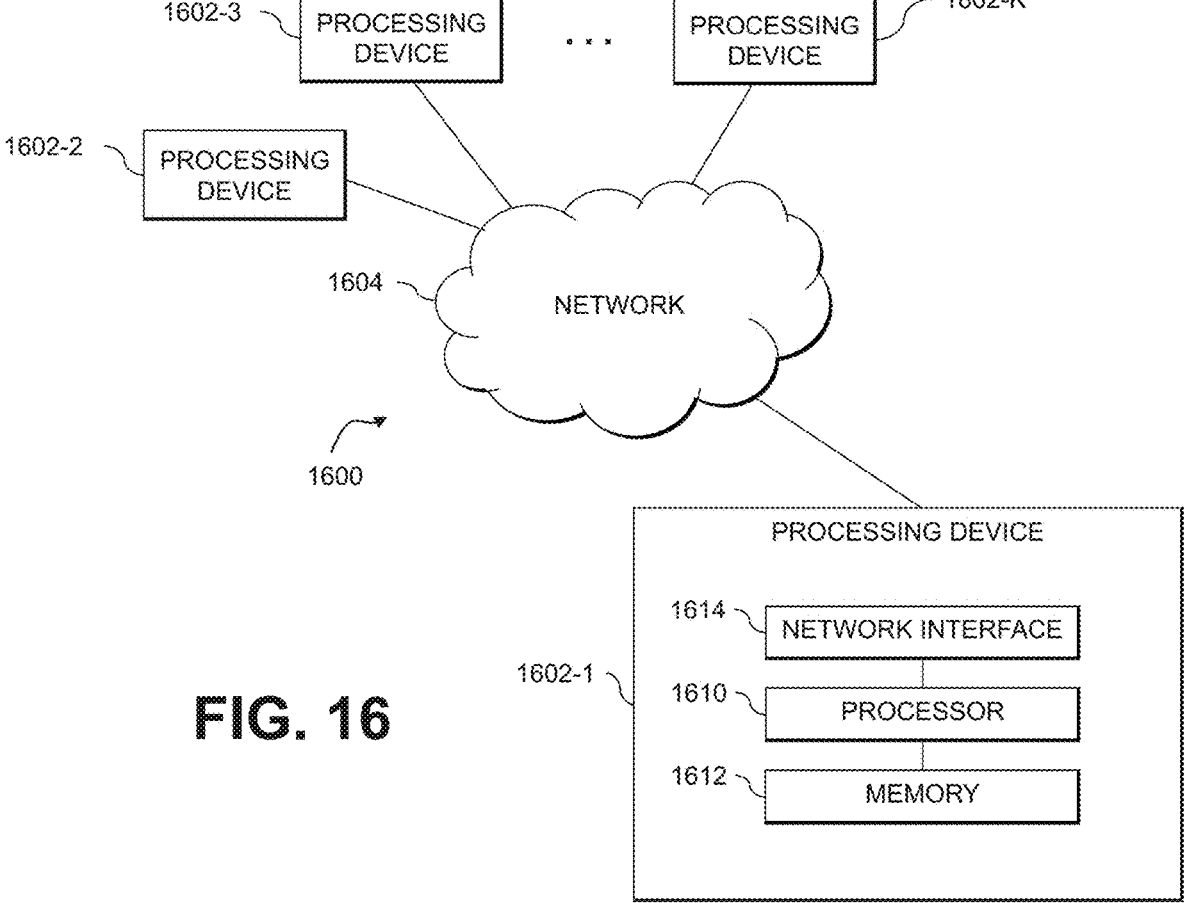

FIG. 15 shows an example processing platform comprising cloud infrastructure 1500. The cloud infrastructure 1500 comprises a combination of physical and virtual processing resources that may be utilized to implement at least a portion of the information processing system 100 in FIG. 1. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. A hypervisor platform may be used to implement a hypervisor within the virtualization infrastructure 1504, where the hypervisor platform has an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for proactive adjustment of resource allocation to IT assets based on predicted resource utilization as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain monitoring data characterizing resource utilization by each of a plurality of information technology assets having resources assigned from a shared resource pool, each of the plurality of information technology assets being associated with one of a set of two or more different resource allocation templates specifying amounts of two or more different resources types allocated from the shared resource pool to that information technology asset;

to select, based at least in part on the obtained monitoring data, a set of features for use in modeling predicted resource utilization by the plurality of information technology assets in one or more future time periods;

to generate, utilizing a machine learning model and the selected set of features, predictions of resource utilization by the plurality of information technology assets in each of the one or more future time periods;

to determine whether the predicted resource utilization by a given one of the plurality of information technology assets for one or more resource types exhibits at least a threshold difference from a current one of the resource allocation templates associated with the given information technology asset; and responsive to determining that the predicted resource utilization by the given information technology asset for the one or more resource types exhibits at least the threshold difference from the current resource allocation template associated with the given information technology asset, to proactively scale resources of at least a given one of the two or more different resources types which are allocated to the given information technology asset from the shared resource pool for a given future time period by associating another one of the two or more different resource allocation templates with the given information technology asset in place of the current resource allocation template, wherein the proactive scaling is based at least in part on the predicted resource utilization, for the given future time period, by the given information technology asset and by one or more other ones of the plurality of information technology assets having resources assigned from the shared resource pool.

2. The apparatus of claim 1 wherein the plurality of information technology assets comprise a plurality of virtual machines in a virtual machine cluster, and wherein the shared resource pool comprises resources of a virtualization infrastructure on which the plurality of virtual machines of the virtual machine cluster run.

3. The apparatus of claim 2 wherein the virtualization infrastructure comprises a host device running a bare metal hypervisor.

4. The apparatus of claim 2 wherein the virtual machine cluster comprises two or more host devices running bare metal hypervisors.

5. The apparatus of claim 2 wherein the predictions of resource utilization comprise predictions of central processing unit usage, memory usage, and guest filesystem utilization.

6. The apparatus of claim 1 wherein the two or more different resource types comprises processing resources, memory resources, and storage resources.

7. The apparatus of claim 1 wherein the machine learning model comprises a vector autoregression model.

8. The apparatus of claim 7 wherein the vector autoregression model comprises a vector autoregression model for multi-step forecasting with dynamic selection of exogenous variables.

9. The apparatus of claim 1 wherein the machine learning model comprises a long short-term memory machine learning model.

10. The apparatus of claim 1 wherein the at least one processing device is configured to adjust one or more configuration parameters of the machine learning model based at least in part on cross-validation of machine learning prediction performance at an individual information technology asset level.

11. The apparatus of claim 1 wherein selecting the set of features is based at least in part on at least one of:

determining relationships between different ones of a plurality of features based at least in part on performing bivariate or multivariate analysis and plotting a correlation matrix;

finding correlated ones of the plurality of features utilizing Pearson coefficient; and checking for multicollinearity of different ones of the plurality of features.

12. The apparatus of claim 1 wherein proactively scaling the resources of the given one of the two or more different resource types which are allocated to the given information technology asset from the shared resource pool for the given future time period comprises dynamically scaling resources of the given resource type which are allocated to the given information technology asset while the given information technology asset is operating.

13. The apparatus of claim 1 wherein the given information technology asset runs a given application workload, and wherein the current resource allocation template associated with the given information technology asset is selected based at least in part on a current stage of an application lifecycle of the given application workload.

14. The apparatus of claim 1 wherein the same set of two or more different resource allocation templates are utilized for respective different application workloads executing on different ones of the plurality of information technology assets.

15. The apparatus of claim 1 wherein the proactive scaling comprises reducing resources of the given resource type which are allocated to the given information technology asset from the shared resource pool for the given future time period.

16. The apparatus of claim 1 wherein the proactive scaling comprises increasing resources of the given resource type which are allocated to the given information technology asset from the shared resource pool for the given future time period.

17. A computer program product comprising a non-transitory processor-readable storage medium having stored therein program code of one or more software programs, wherein the program code when executed by at least one processing device causes the at least one processing device:

to obtain monitoring data characterizing resource utilization by each of a plurality of information technology assets having resources assigned from a shared resource pool, each of the plurality of information technology assets being associated with one of a set of two or more different resource allocation templates specifying amounts of two or more different resources types allocated from the shared resource pool to that information technology asset;

to select, based at least in part on the obtained monitoring data, a set of features for use in modeling predicted resource utilization by the plurality of information technology assets in one or more future time periods;

to generate, utilizing a machine learning model and the selected set of features, predictions of resource utilization by the plurality of information technology assets in each of the one or more future time periods;

to determine whether the predicted resource utilization by a given one of the plurality of information technology assets for one or more resource types exhibits at least a threshold difference from a current one of the resource allocation templates associated with the given information technology asset; and responsive to determining that the predicted resource utilization by the given information technology asset for the one or more resource types exhibits at least the threshold difference from the current resource allocation template associated with the given information technology asset, to proactively scale resources of at least a given one of the two or more different resources types which are allocated to the given information technology asset from the shared resource pool for a given future time period by associating another one of the two or more different resource allocation templates with the given information technology asset in place of the current resource allocation template, wherein the proactive scaling is based at least in part on the predicted resource utilization, for the given future time period, by the given information technology asset and by one or more other ones of the plurality of information technology assets having resources assigned from the shared resource pool.

18. The computer program product of claim 17 wherein the plurality of information technology assets comprise a plurality of virtual machines in a virtual machine cluster, and wherein the shared resource pool comprises resources of a virtualization infrastructure on which the plurality of virtual machines of the virtual machine cluster run.

19. A method comprising:

obtaining monitoring data characterizing resource utilization by each of a plurality of information technology assets having resources assigned from a shared resource pool, each of the plurality of information technology assets being associated with one of a set of two or more different resource allocation templates specifying amounts of two or more different resources types allocated from the shared resource pool to that information technology asset;

selecting, based at least in part on the obtained monitoring data, a set of features for use in modeling predicted resource utilization by the plurality of information technology assets in one or more future time periods;

generating, utilizing a machine learning model and the selected set of features, predictions of resource utilization by the plurality of information technology assets in each of the one or more future time periods;

determining whether the predicted resource utilization by a given one of the plurality of information technology assets for one or more resource types exhibits at least a threshold difference from a current one of the resource allocation templates associated with the given information technology asset; and responsive to determining that the predicted resource utilization by the given information technology asset for the one or more resource types exhibits at least the threshold difference from the current resource allocation template associated with the given information technology asset, proactively scaling resources of at least a given one of the two or more different resources types which are allocated to the given information technology asset from the shared resource pool for a given future time period by associating another one of the two or more different resource allocation templates with the given information technology asset in place of the current resource allocation template, wherein the proactive scaling is based at least in part on the predicted resource utilization, for the given future time period, by the given information technology asset and by one or more other ones of the plurality of information technology assets having resources assigned from the shared resource pool;

wherein the method is performed by at least one processing device comprising a processor coupled to a memory.

20. The method of claim 19 wherein the plurality of information technology assets comprise a plurality of virtual machines in a virtual machine cluster, and wherein the shared resource pool comprises resources of a virtualization infrastructure on which the plurality of virtual machines of the virtual machine cluster run.

* * * * *